United States Patent
Ganapathy et al.

(10) Patent No.: US 6,182,089 B1
(45) Date of Patent: *Jan. 30, 2001

(54) METHOD, SYSTEM AND COMPUTER PROGRAM PRODUCT FOR DYNAMICALLY ALLOCATING LARGE MEMORY PAGES OF DIFFERENT SIZES

(75) Inventors: Narayanan Ganapathy, San Jose; Luis F. Stevens, Milpitas; Curt F. Schimmel, San Ramon, all of CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/935,820

(22) Filed: Sep. 23, 1997

(51) Int. Cl.[7] .................................................... G06F 17/30
(52) U.S. Cl. .............................................................. 707/206
(58) Field of Search ............................................. 707/206

(56) References Cited

U.S. PATENT DOCUMENTS

| | | | |
|---|---|---|---|
| 5,058,003 | 10/1991 | White ................................. | 364/200 |
| 5,088,036 | * 2/1992 | Ellis et al. ......................... | 707/206 |
| 5,263,136 | * 11/1993 | DeAguillar ........................ | 345/511 |
| 5,420,999 | * 5/1995 | Mundy ............................... | 711/173 |
| 5,446,854 | 8/1995 | Khalidi et al. .................... | 395/401 |
| 5,465,337 | 11/1995 | Kong .................................. | 395/417 |
| 5,481,702 | * 1/1996 | Takahashi .......................... | 707/205 |
| 5,561,785 | * 10/1996 | Blandy et al. ..................... | 711/170 |
| 5,577,243 | * 11/1996 | Sherwood et al. ................ | 707/7 |
| 5,727,178 | 3/1998 | Pletcher et al. .................. | 395/412 |
| 5,778,392 | * 7/1998 | Stockman et al. ............... | 707/205 |

OTHER PUBLICATIONS

Talluri et al., "A New Page Table for 64–bit Address Spaces", Proceedings of SOSP 1995.

(List continued on next page.)

Primary Examiner—Wayne Amsbury
(74) Attorney, Agent, or Firm—Sterns, Kessler, Goldstein & Fox PLLC

(57) ABSTRACT

A method, system and computer program product for dynamically allocating large memory pages of different sizes. Each process can select multiple page sizes. An algorithm referred to as a "Coalescing Daemon" is used to allocate large pages. "High water marks" are specified to the operating system. A high water mark is the maximum percentage of total system memory that the Coalescing Daemon coalesces for a given page size. The high water marks are used to allocate a number of free memory pages for each specified page size. Separate freelists are created and maintained for each page size. Each freelist comprises a linked list of data structures that represent free physical memory pages. A bitmap is set-up by the operating system to represent all memory available to processes. The bitmap is used for determining which memory pages are free during coalescing. The Coalescing Daemon allocates memory pages using a weak, mild and strong coalescing policy. The weak policy is performed first, followed by the mild and the strong policies. The mild and strong policies are performed only if the preceding policy or policies fail. The weak policy searches the bitmap for free contiguous areas of memory and inserts an entry into the associated freelist if found. If the weak policy is unsuccessful, the mild policy attempts to find a suitable chunk of memory which is used to create a contiguous chunk of free memory by migrating busy base pages to other areas. The mild coalescing policy searches the bitmap for a chunk of memory in which the set bits (i.e. the free base pages) are above a tunable predetermined threshold value. Thus, a limited amout of migration is performed according to predetermined threshold. If the mild coalescing policy fails the strong coalescing policy is performed. In the strong coalescing policy, base pages are migrated to create a free chunk, regardless of a threshold amount.

21 Claims, 15 Drawing Sheets

OTHER PUBLICATIONS

Khalidi et al., "Virtual Memory Support for Multiple Page Sizes", Sun MicroSystems Laboratories, Inc., Sep. 1993.

Romer et al., "Reducing TLB and Memory Overhead Using Online Superpage Promotion", Proceedings of the $22^{nd}$ Annual International Symposium on Computer Architecture, 1995.

Talluria, Madhusudhan and Mark D. Hill, "Surpassing the TLB Performance of Superpages with Less Operating System Support", Proceedings of the Sixth International Conference on Architectural Support for Programming Languages and operating Systems, Oct. 1994.

Goodheart, B. and Cox, J., *The Magic Garden Explained: The Internals of UNIX® System V Release* 4, *An Open Systems Design*, Prentice–Hall, 1994, pp. 69–140.

* cited by examiner

FIG. 3
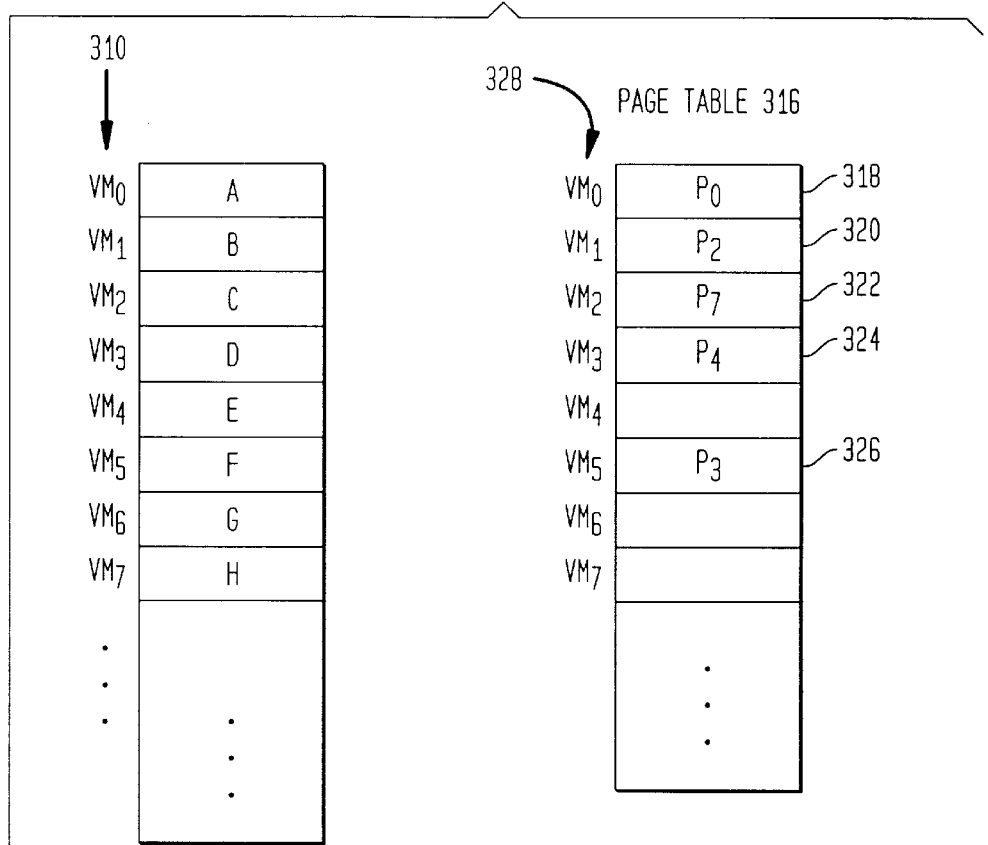
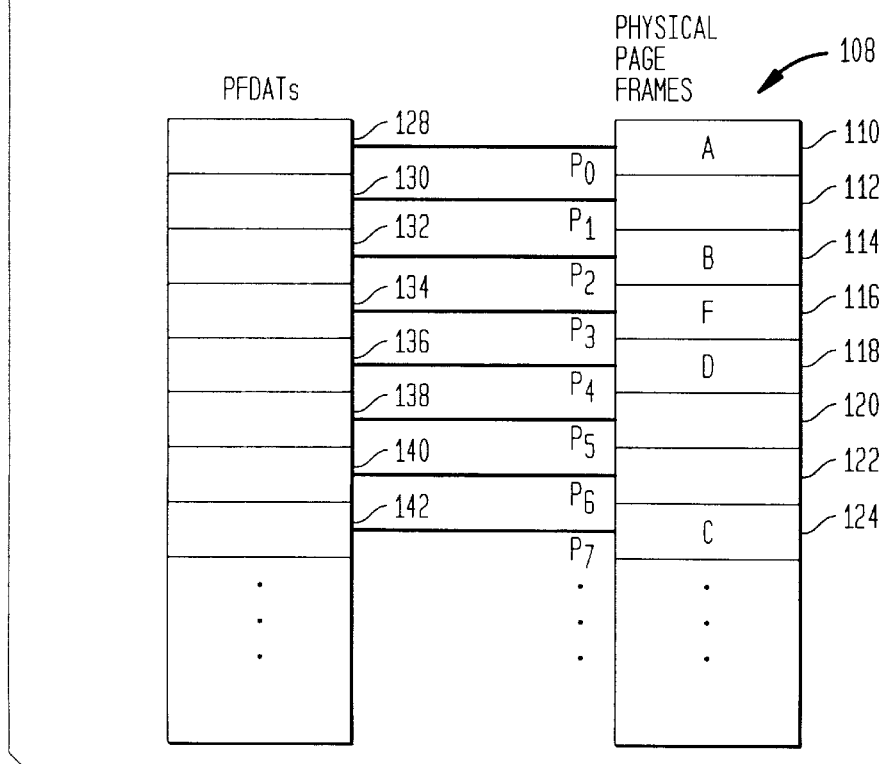

FIG. 11

```
1102  base_pagesize= 16k; largest_pagesize = 16m;
1103  first_pfn;    /* Pfn corresponding to first page in memory */
1104  last_pfn;     /* Pfn corresponding to the last page in memory */
1105  NUM_COALESCING_TRIES = 5
1106  WEAK_POLICY;  /* Weak policy. Simple check of bitmaps. No migration */
1107  MILD_POLICY;  /* Mild policy. Migration if a few pages in a chunk are free */
1108  STRONG_POLICY;/* Strong policy. Brute force migration */
1109  coalesced()
1110  {
1111  start:
1112           while(always true) {/* Loop forever */
1113                   if(processes are waiting for large pages)
1114                           policy = STRONG_POLICY;
1115                   else policy = WEAK_POLICY;
1116                   if((policy == WEAK_POLICY) || (policy == MILD_POLICY))
1117                           num_tries = NUM_COALESCING_TRIES;
1118                   else
1119                           num_tries = 1;
1120                   while (num_tries) {
1121                           coalesce_engine(policy);
1122                           if(high watermark reached for all pages) goto sleep;
1123                           sleep for a configured timeout for the given policy;
1124                           num_tries = num_tries -1;
1125                   }
1126                   if (policy == WEAK_POLICY)
1127                           policy = MILD_POLICY;
1128                   else if(policy == MILD_POLICY)
1129                           policy = STRONG_POLICY;
1130                   else if(policy == STRONG_POLICY)
1131                           policy = WEAK_POLICY;
1132           }
1133  sleep:
1134           sleep waiting for somebody to wake us up;
1135           goto start;
1136  }
```

FIG. 12

```
1202  coalesce_engine(policy)
1203  {
1204          current_pagesize = largest_pagesize;
1205          current_chunk = first_pfn;
1206          while (current_chunk <=last_pfn) {
1207                  coalesce_chunk(bitmap, current_chunk, current_pagesize, policy);
1208                  current_chunk = current_chunk + largest_pagesize;
1209                  IF (HIGH WATERMARK REACHED FOR ALL PAGESIZES)
1210                          break;
1211          }
1212  }
```

FIG. 13

```
1302  coalesce_chunk(bitmap, current_chunk, current_pagesize, policy)
1303  {
1304          if((HIGH WATERMARK REACHED FOR current_pagesize)              ||
1305                  coalesce_leaf_chunk(bitmap, current_chunk, current_pagesize,
1306                                  policy) != SUCCESS) {
1307              npgs= current_pagesize/next_lower_page_size;
1308              current_pagesize=next lower page size;
1309              while (npgs > 0) {
1310                      coalesce_chunk(bitmap, current_chunk,
1311                                              current_pagesize, policy);
1312                      current_chunk = current_chunk + current_pagesize;
1313                      npgs = npgs - 1;
1314              }
1315          }
1316  }
```

FIG. 14

```
1402  coalesce_leaf_chunk(bitmap, current_chunk, current_pagesize, policy)
1403  {
1404        if(current_pagesize == base_pagesize)
1405              done;
1406        if(high watermark not reached for current_pagesize) {
1407              N = current_pagesize / base_pagesize;
1408              search bitmap starting at current chunk;
1409
1410              if(policy is WEAK_POLICY) {
1411                    if(num consecutive bits set in current_chunk == N) {
1412                          remove pfdats corresponding to free bits from
1413                                lower page size freelists;
1414                          insert first pfdat of the current chunk into
1415                                current_pagesize freelist;
1416                          current_chunk = current_chunk +
1417                                              current_pagesize;
1418                          return SUCCESS;
1419                    }else
1420                          return FAILURE;
1421              } else if(policy is MILD_POLICY) {
1422                    if(num consecutive bits set in current_chunk>
1423                                threshold for current_pagesize) {
1424                          if(pages with busy bits cannot be migrated)
1425                                return FAILURE;
1426                          remove pfdats corresponding to free bits from
1427                                lower page size freelists;
1428                          move pages associated with busy bits
1429                                using the page migration algorithm;
1430                          insert first pfdat of the current chunk into
1431                                current_pagesize freelist;
1432                          return SUCCESS;
1433                    }else
1434                          return FAILURE;

1435              } else if(policy is STRONG_POLICY) {
1436                          if(pages with busy bits cannot be migrated)
1437                                return FAILURE;
1438                          remove pfdats corresponding to free bits from
1439                                lower page size freelists;
1440                          move pages associated with busy bits
1441                                using the page migration algorithm;
1442                          insert first pfdat of the current chunk into
1443                                current_pagesize freelist;
1444                          return SUCCESS;
1445              } else
1446                          return FAILURE;
1447  }
```

FIG. 15

```
1502  pagefree(pfdat to be freed, page_size
1503  {
1504          ...
1505          insert pfdat into freelist corresponding to page_size;
1506          set bit(s) corresponding to pfdat;
1507          ...
1508          current_pagesize = largest_pagesize;
1509          while (current_pagesize != page_size) {
1510                  if (high water mark not reached for current_pagesize) {
1511                          scan adjacent bits to see if we can coalesce
1512                                  those pages to a page of current_pagesize;
1513                          if successful {
1514                                  remove pfdats corresponding to free bits from the
1515                                  freelists;
1516                                  insert lowest pfdat into current_pagesize freelist;
1517                                  break;/* finished */
1518                          }
1519                  }
1520                  current_pagesize = next_lower_pagesize;
1521          }
1522  }
```

FIG. 16

```
1602  migrate_page_list(
1603         current pfdat_list/* List of pages to migrate */)
1604  {
1605         new_pfdat_list = NULL; /*
1606         current_pfdat = first pfdat in current pfdat_list;
1607         while (current_pfdat is not NULL) {
1608                new_pfdat = allocate a base page (skip
1609                                splitting of large pages);
1610                remove current_pfdat from its memory object cache;
1611                insert new_pfdat into the memory object cache;
1612                use reverse map in current_pfdat to find page table entries
1613                        that use current_pfdat;
1614                invalidate all page table entries found in the reverse map;
1615                move reverse map from current_pfdat to new_pfdat;
1616                new_pfn = pfdattopfn(new_pfdat);
1617                update all page table entries to have new_pfn;
1618                insert new_pfdat in new_pfdat_list;
1619                current_pfdat = next pfdat in current pfdat_list;
1620         }
1621         flush tlb entries;
1622         current_pfdat = first pfdat in current_pfdat_list;
1623         new_pfdat = first_pfdat in new_pfdat_list;
1624         while (current_pfdat is not NULL) {
1625                new_pfdat = first_pfdat in new_pfdat_list;
1626                copy data from page corresponding to current_pfdat to page corresponding
1627                        to the new_pfdat;
1628                validate page table entries of in the reverse map of new_pfdat;
1629                current_pfdat = next pfdat in current_pfdat_list;
1630                new_pfdat = next pfdat in new_pfdat_list;
1631         }
1632  }
```

METHOD, SYSTEM AND COMPUTER PROGRAM PRODUCT FOR DYNAMICALLY ALLOCATING LARGE MEMORY PAGES OF DIFFERENT SIZES

BACKGROUND OF THE INVENTION

1. Field of the Invention

The present invention relates generally to allocation of memory in a computer system and more particularly to a system, method, and computer program product for dynamically allocating large memory pages.

2. Related Art

As the speed and capacity of computer hardware systems continue to increase, so have the demands of application programs that run on them. Recently, a new breed of application programs have emerged that require huge amounts of main memory during execution. For example, it is not unusual for database and data mining applications to demand thousands of megabytes of memory allocation during program execution.

Generally, most operating systems manage memory in terms of individual memory pages. More specifically, memory in the computer system is divided into a number of memory pages. Such memory pages typically have a fixed size such as 4 or 16 Kilobytes (KB) per page. Accordingly, when an application program requests a specific amount of memory during program execution, a particular number of memory pages are reserved for that purpose.

For example, in a system with 16KB memory pages, when an application program requests 256 KB of memory, the operating system reserves 16 pages of physical memory for the application program making the request.

Once a memory page is allocated for a particular process, an entry is added to a page table. Generally, each process has an associated page table, although this may not be the case in all systems. The page table entry maps a physical memory page to the virtual address space associated with the process. Accordingly, when the process needs to access the allocated memory page, the page table entry is consulted to find the corresponding physical address for the requested memory page.

In order to increase overall system performance, most computer systems employ a cache system for frequently and or most recently used page table entries (PTEs). One example of such a cache system is a translation look aside buffer (TLB). TLBs are generally implemented in hardware and comprise information similar to that in the page table. That is, like the page table, TLBs are used to map the virtual address of memory pages to the physical address of memory pages. Because the TLBs are implemented in hardware, address translations are generally much faster than translations using page tables, which are generally implemented in software.

Accordingly, many computer systems maintain translations associated with the most recent and/or the most frequently accessed memory pages in TLBs.

As such, whenever a process needs to access a memory page, the system-wide TLB is searched first. The much slower process of searching (or "walking through") the page table is performed only when the desired translation is not found within the TLB.

When an address translation is found within the TLB, a TLB cache hit or more simply, a TLB hit occurs. When an address translation is not found within the TLB, and the system must resort to a page table walk-through, a TLB miss occurs. For increased system performance it is clearly desirable to minimize TLB misses and maximize TLB hits.

However, because the TLB is implemented in hardware, it generally has a limited capacity that cannot be changed. For example, a MIPS R10000 RISC microprocessor, manufactured by MIPS Technology, Inc., has a capacity of 64 TLB entries, wherein each TLB entry comprises 2 sub-entries. The sub-entries are related to one another in that they map adjacent memory pages. Thus, at most, such a TLB has a capacity to store 128 page translations. For a system that defines fixed sized 16 KB memory pages, this translates into a TLB range of 16 KB * 128, or 2 megabytes (2 MB).

For applications requiring a large amount of memory pages, the TLB can quickly become exhausted thereby causing an inordinate amount of TLB misses. For example, suppose during program execution, a large database program allocates a total of 10 MB of memory. This translates into 640 16 KB memory pages. In a system with a TLB capacity of 128 entries, at most, accesses to 128 pages would generate a TLB hit and access to the remaining 512 pages would generate TLB misses. Thus, for such applications serious performance problems occur.

In order to alleviate such performance problems it is desirable to increase the page size for certain applications. An example of such an application is a large database program. These programs typically have large working data sets comprising multiple database tables, indexes and the like.

Having a large page size defined for such applications can cause a significant increase to overall system performance. First, large size pages significantly reduces the number of page faults an application has to go through to initially get its working data set in memory. For example, if a system or virtual system (VM) supports a 1 MB page size, then an application having a 10 MB data size would just need 10 page faults instead of 640 (for a system with a 16 KB page size) to get its working set into memory.

Second, large size pages significantly reduces the number of TLB misses during program execution. For example, in a virtual machine that supports a 1 MB page size, an application having a 10 MB data size would require only 10 TLB entries for the entire 10 MB of memory. In contrast, for a VM that only supports a 16 KB page size, the entire TLB would be quickly exhausted (i.e. with the first 128 entries), thereby causing TLB misses for the remaining 512 pages.

Therefore, what is needed is a system, method and computer program product for dynamically allocating large memory pages of different sizes for processes that require them. Such large pages need to be allocated dynamically and as quickly as possible to avoid decreases in system performance.

SUMMARY OF THE INVENTION

Accordingly, the present invention provides a method, system and computer program product for dynamically allocating large memory pages of different sizes. In a preferred embodiment, various page sizes such as 4 KB, 64 KB, 256 KB, 1 MB, 4 MB and 16 MB page sizes can be requested by an application programmer (hereinafter "user") at the application level. Further each process can select multiple page sizes.

Preferably, a particular page size is specified for a particular range of virtual address space. For example in one embodiment, a user, or an operating system may select large page sizes for areas of data that require large pages and can select a smaller page size for areas of data that require smaller pages.

An algorithm referred to herein as a "Coalescing Daemon" is used in a preferred embodiment to find and create large pages for application programs. "High water marks" are specified to the operating system. A high water mark is the maximum percentage of total system memory that the Coalescing Daemon needs to coalesce for a given page size. During an initialization routine, these high water marks are used by the Coalescing Daemon to allocate a number of free memory pages for each specified page size. For example, if a user typically runs large database programs, they would want to specify that a large portion of the system memory should be allocated to large memory pages. For example, a specification may designate that 20% of system memory is to be allocated in 16 KB pages, 20% in 256 KB pages and 60% in 1 MB pages.

Accordingly, the Coalescing Daemon attempts to allocate the requested number of memory pages for each memory page size according to the specified high water marks. Separate freelists are created for each page size. In a multi-node computer system, such as a NUMA computer system, a set of freelists are generated for each node. Each freelist comprises a linked list of data structures that represent and store data related to physical memory pages.

In a preferred embodiment, the Coalescing Daemon uses a memory S bitmap to determine which memory pages are free and which are busy. A bitmap is set-up by the operating system to represent all of the memory available to processes. In a multi-node machine, one bitmap is set up to represent useable memory within each node.

Preferably, the bitmap represents memory in base page size segments. A base page size is defined as the smallest page size that is available for application programs. Typically, 4 KB or 16 KB is defined as a base page size. However, the actual base page size definition depends on each specific implementation of the present invention. For clarity, in the examples used herein, it is assumed that a 16 KB base page size is defined.

Accordingly, each 16 KB portion of memory is represented by a single bit in the bitmap. This speeds up the process of searching for available memory. In a preferred embodiment, free pages are represented by set bits and busy pages are represented by cleared bits.

In a preferred embodiment, the Coalescing Daemon allocates large memory pages using a weak, mild and strong coalescing policy that are preformed in the preceding order. The weak policy is performed first, followed by the mild and the strong policies. The mild and strong policies are performed only if the preceding policy or policies fail. In alternative embodiments, one or more policies can be performed in different orders other than described above.

Specifically, the weak policy searches the bitmap for free areas of memory. For example, if a 256 KB page is needed the Coalescing Daemon performs the weak coalescing policy and searches the bitmap, at 256 K boundaries, for 16 contiguous free base pages. If such a 256 K "chunk" of memory is found, the corresponding 16 entries are removed from the 16 KB freelist and one entry is added to the 256 KB freelist.

If the weak coalescing policy is unsuccessful in finding a 256 KB page, the mild policy is performed. The mild coalescing policy attempts to find a suitable chunk of memory (according to a specified criterion, described below), which is used to create a contiguous chunk of free memory by migrating busy base pages to other areas of memory.

Specifically, in the mild coalescing policy, the bitmap is searched for a chunk of memory in which the set bits (i.e. the free base pages) are above a predetermined threshold amount. In this fashion, the operating system attempts to perform only a limited amout of migration in order to speed up the overall process. The maximum amount of migration that is performed using the mild coalescing policy depends directly on the predetermined threshold amount that is specified.

The predetermined threshold amount is preferably, a tunable parameter that can be specified by an operating system, a user, a compiler, or another programming tool. If a suitable chunk is found using the mild coalescing policy, the busy pages within the chunk are moved to an area of memory outside of the chunk using a migration policy and the appropriate freelists are modified.

If the mild coalescing policy fails the strong coalescing policy is performed. In the strong coalescing policy, base pages are migrated regardless of a threshold amount. That is, the strong policy attempts to free up a contiguous chunk of memory having the requested page size, regardless of how many pages need to be migrated.

Accordingly, by using a three pass method (i.e. the weak, mild and strong policies), the Coalescing Daemon allocates a large memory page dynamically in the most efficient manner possible, depending on the present system state.

In one embodiment of the present invention, a splitting algorithm is used to quickly allocate a memory page associated with a request for a page other than the largest page size. The splitting algorithm is used when there are no entries in the freelist associated with the requested page size, but there is at least one entry in a freelist of a larger page size. The splitting algorithm removes the entry from the freelist in the larger page size and creates multiple entries in the freelist(s) of smaller page sizes.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention is described with reference to the accompanying drawings, wherein:

FIG. 3 is a block diagram depicting the relationship between virtual memory and physical memory, using a page table;

FIGS. 11–14 are examples of processes in pseudo-code that can be used to implement the Coalescing Daemon according to a preferred embodiment of the present invention;

FIG. 15 is an example of a process in pseudo-code that can be used to implement a method of allocating large memory pages when memory pages are freed, according to a preferred embodiment of the present invention; and FIG. 16 is an example of a process in pseudo-code that can be used to implement memory migration according to a preferred embodiment of the present invention.

DETAILED DESCRIPTION OF THE PREFERRED EMBODIMENTS

The present invention provides a method, system and computer program product for dynamically allocating large memory pages. The present invention can be implemented in a variety of computer systems and environments, including, but not limited to, uni-processor computer systems, shared memory, symmetric multi-processing (SMP) systems and distributed shared memory (DSM) multi-processor systems. For example, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

When the present invention is implemented in a multi-processor non-uniform memory access (NUMA) computer system, the concepts described herein are preferably performed on a node basis.

In order to describe the details of the present invention, it is useful to first describe a typical computer system environment in which the present invention can be used. As indicated above, the present invention can be embodied within an operating system. As such, the examples used herein refer to an operating system. This description is used for exemplary purposes only and to distinctly point out the details of the present invention. As such, these examples should not be construed to limit the scope and breadth of the present invention.

Typical modern operating systems generate data structures that represent physical memory pages. The data structures are also used to store additional information about each page of memory that it represents. These data structures can be implemented in a variety of ways and are referred to by a variety of names. For example, in Silicon Graphics' IRIX operating system, these data structures are referred to as page frame data structures, or PFDATs.

Throughout the remainder of this specification, the terms page frame data structure and PFDAT are used interchangeably to refer to data structures that represent pages of physical memory. Whenever the terms page frame data structure or PFDAT is used, it is to be understood that they are used in a broad sense and refer to any data structure that is employed to represent pages of physical memory.

Figure 1:
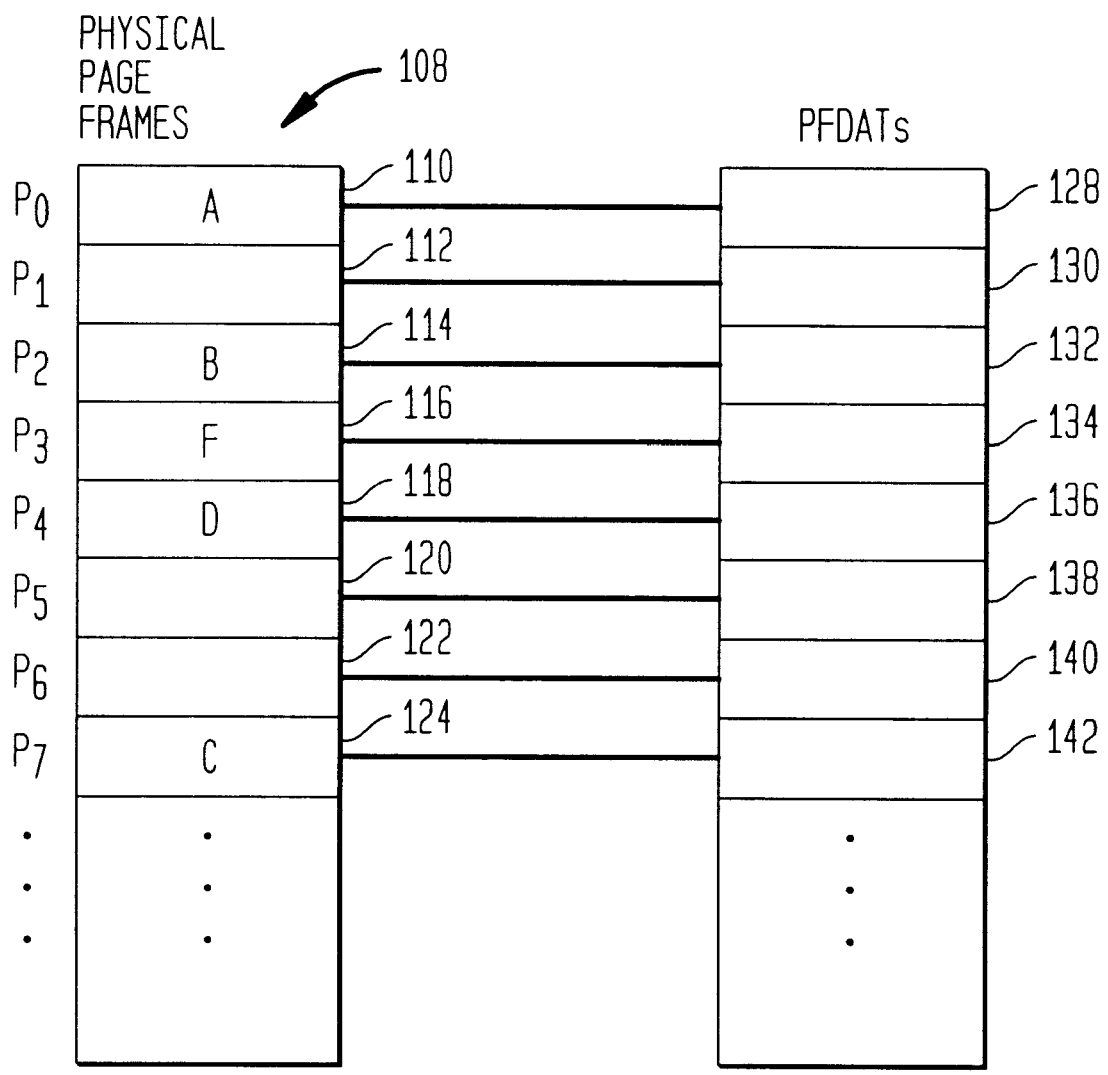
FIG. 1 is a block diagram depicting the relationship between a PFDAT and physical memory according to a preferred embodiment of the present invention.

Typical operating systems divide main memory into segments referred to as memory pages. FIG. 1 is a block diagram depicting the relationship between PFDATs and physical memory. In FIG. 1, main memory 108 is divided into a number of page frames, or memory pages 110–124.

Each memory page 110–124 is represented by a corresponding PFDAT 128–142, respectively. The operating system uses each PFDAT 128–142 to store information related to the associated memory page 110–124 and to locate the physical pages 128–142 represented by each PFDAT 128–142.

Preferably, the address of a page of memory that a PFDAT represents is stored implicitly by noting the relative position of the PFDAT in memory. From the relative position of the PFDAT, the physical page address can be computed. This method of identifying a physical page address is generally preferred because it saves storage overhead by not storing a pointer. Alternatively, PFDATs 128–142 can store a pointer to a page of physical memory that the PFDAT represents.

As stated, each PFDAT 128–142 typically stores information related to their associated memory page. For example, the PFDATs 128–142 can include fields for indicating whether data stored in the associated page of physical memory is clean or dirty.

In multi-processor systems, or multi-threaded operating systems, PFDATs can be shared by multiple processes. Accordingly, a PFDAT may contain information about a process or processes currently using the memory page associated with the PFDAT.

For example, in one implementation, each PFDAT contains one or more fields referred to as reverse maps. These reverse map fields are used to identify the process or processes that are currently mapped to the physical memory page associated with the PFDAT. In one implementation, the reverse map fields are used to point to particular page table entries (PTEs) associated with each process currently mapped to the PFDAT's associated memory. PTEs are described in detail below.

Figure 2:
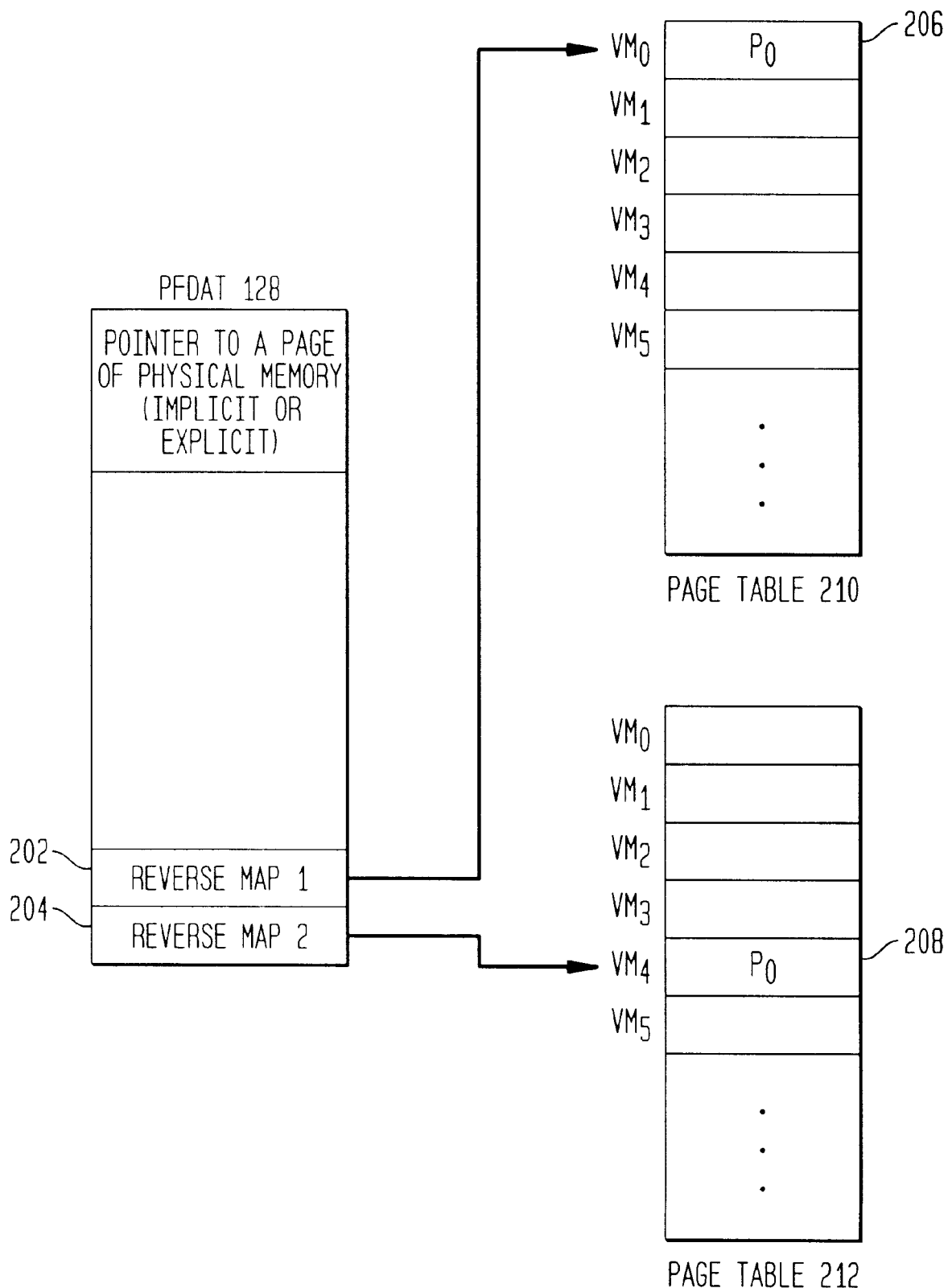
FIG. 2 is a block diagram depicting the relationship between PFDATs and page table entries, via reverse map fields within the PFDAT, according to a preferred embodiment of the present invention.

For example, referring to FIG. 2, the PFDAT 128 comprises two reverse map fields 202 and 204. The reverse map field 202 points to the page table entry (PTE) 206 in the page table 210. Similarly, the reverse map field 204 points to the PTE 208 in the page table 212. As described below, a preferred embodiment uses these reverse maps to update page tables, such as the page tables 210 and 212, when migrating memory pages that are currently mapped to one or more processes.

For further information pertaining to reverse maps, refer to the commonly owned pending U.S. Patent Application entitled "System, Method and Computer Program Product for Reverse Mapping Memory to Referencing Data Structures", Attorney Docket No. 154472, filed on Sep. 19, 1997 and which is hereby incorporated by reference in its entirety.

Single and multi-processor computer systems are typically capable of running multiple applications at a time or multiple instances of the same application at the same time. In order to accomplish this task, each application typically has an associated virtual address space. Thus, when an application references a particular memory page, the virtual address for the memory page is used. The operating system then translates or maps the virtual address to a physical address through the use of a page table.

In this fashion, two processes may reference the same virtual memory page but may actually access two different physical memory pages. Accordingly, processes using similar virtual addresses can operate in the same machine without interfering with each other's data. In fact, by using a virtual address scheme it is possible to run multiple instances of the same application program on the same machine at the same time. In this example each instance of the application program can use the same virtual addresses, but the data is actually stored in different areas of physical memory.

By the same token, the operating system may permit sharing of data among processes when appropriate. For example, it is common for two or more processes to safely share the same copy of read-only data. This saves memory in that there is no need to store duplicate copies of the same data. The use of virtual address memory mapping schemes as described above is well known and would be apparent to persons skilled in the relevant art(s).

As stated, page tables are used to map virtual addresses to physical addresses. Each mapping is referred to as a page table entry (PTE). Typically, each PTE comprises a mapping for one page of memory. Generally, page table entries are implicitly indexed by virtual page addresses.

FIG. 3 is a block diagram showing the relationships among a virtual address space, a page table and physical memory pages (along with their associated PFDATs). In FIG. 3, a virtual memory mapping scheme is illustrated for the virtual addresses 310 ($VM_0$–$VM_7$), that are each used to store data A–H, respectively. As illustrated in the virtual address space 310, data "A" is associated with the virtual memory address $VM_0$, data "B" is associated with virtual memory address $VM_1$ and data "C" is associated with virtual address $VM_2$. Similarly, the data represented by "D", "E", "F", "G" and "H" are each associated with the virtual addresses $VM_3$, $VM_4$, $VM_5$, $VM_6$ and $VM_7$, respectively.

The page table 316 provides the translations between the virtual memory addresses 310 and the physical page frames 108. The page table 316 generally includes an implied index 328 of virtual memory addresses 310 and a page table entry (PTE) 318–326 for each mapped page of virtual memory. In this example, the index 328 is implied because the page table 316 does not include specific virtual memory addresses. Instead, the first PTE 318 is impliedly associated with the first virtual memory address VMS, the second PTE 320 is impliedly associated with the second virtual memory address, and so on. Typically each process has an associated page table, such as page table 316. Alternatively, some computer systems employ a common page table that is shared among processes. Other systems share portions of page tables among processes. In these cases, each PTE may include a process identification tag (PID) to identify the process associated with the PTE. In the examples used herein, as in the preferred embodiment, each process has its own page table, such as page table 316.

Accordingly, the page table 316 includes a number a PTEs for each mapped page of virtual memory. Each PTE 318–326 references a physical page frame 110–124 that stores data for the associated implied virtual address 328. Each PTE 318–326 thus serves as a virtual memory address to physical memory address translation.

Specifically, whenever a process needs a physical address for mapped data, and the translation is not contained in a translation look aside buffer (TLB) (described below), the page table associated with the process is searched according to a virtual address. If the data is mapped, the physical address in the page table entry is used to access the mapped data. Additional details of virtual memory management can be found in Goodheart and Cox, "*The Magic Garden Explained*," pp. 69–140, Prentice Hall, 1994, incorporated herein by reference The page table translations for the mapped data "A", "B", "C", "D" and "F" are depicted in FIG. 3. Accordingly, data "A" is mapped from virtual memory address $VM_0$ to page frame $P_0$ 110, via the PTE 318. Data "B" is mapped from virtual memory address $VM_1$ to page frame $P_2$ 114, via PTE 320. Data C is mapped from virtual memory address $VM_2$ to page frame $P_7$ 124, via PTE 322. Data "D" is mapped from $VM_3$ to $P_4$ 118, via 324. Finally, data "F" is mapped from $VM_5$ to $P_3$ 116, via PTE 326. Note that in this example, the data represented by "E", "G" and "H" are not currently mapped to physical page frames 108 and thus are not contained in the page table 316 for the example process (not shown).

In order to increase overall system performance, most computer systems employ a cache system for frequently and or most recently used PTEs. One example of such a cache system is a translation look aside buffer (TLB). TLBs are generally implemented in hardware and comprise information similar to that in the page table. That is, like the page table, TLBs are used to map the virtual address of memory pages to the physical address of memory pages. Because the TLBs are implemented in hardware, address translations are generally much faster than translations using page tables, which are generally implemented in software.

Accordingly, many computer systems maintain translations associated with the most recent and/or the most frequently accessed memory pages in TLBs. As such, whenever a process needs to access a memory page, the system-wide TLB is searched first. The much slower process of searching (or "walking through") the page table is performed only when the desired translation is not found within the TLB.

Figure 4:
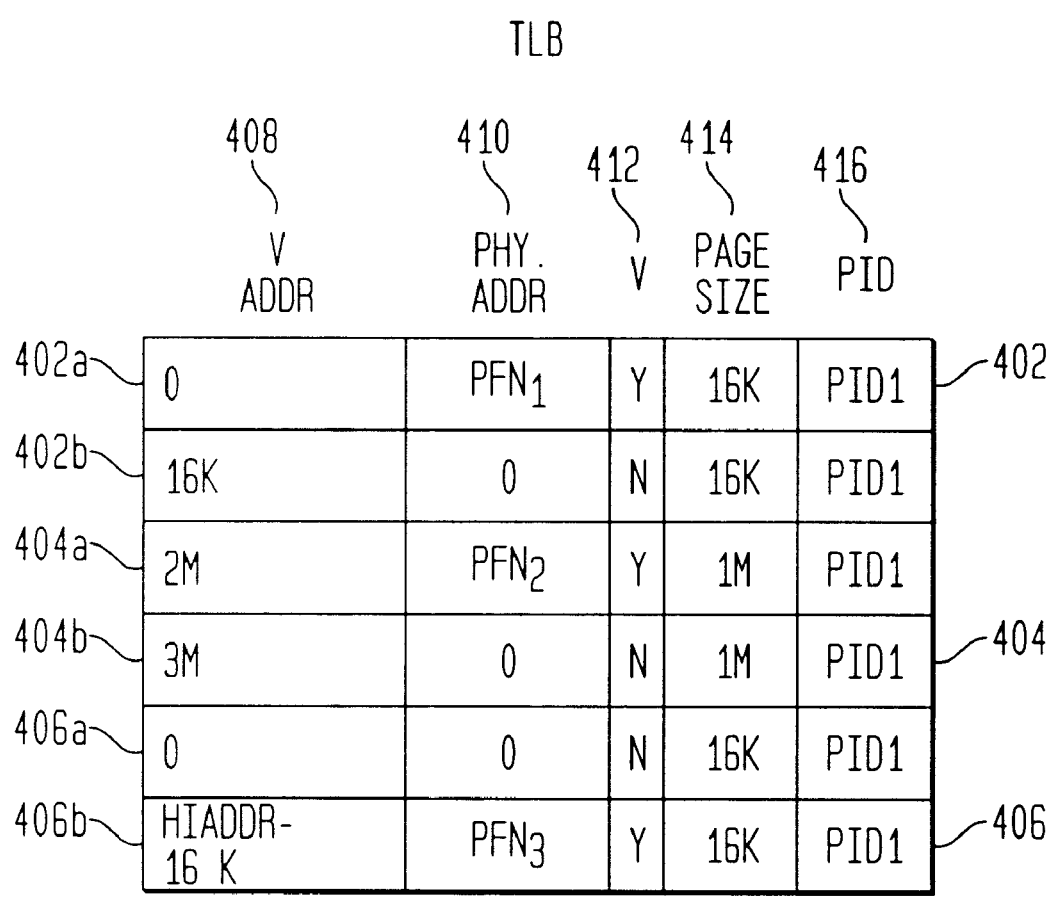
FIG. 4, is a block diagram depicting a TLB according to a preferred embodiment of the present invention.

An example of a typical TLB can be found in a MIPS R10000 microprocessor, manufactured by MIPS Technology, Inc., which comprises 64 TLB entries, each having 2 sub-entries. For example, a portion of a typical TLB is illustrated in FIG. 4. In FIG. 4, three entries are shown 402, 404 and 406, each comprising 2 sub-entries 402a, 402b, 404a, 404b, 406a and 406b, respectively. In this example, the even addressed adjacent pages are placed in the top sub-entries 402a, 404a and 406a, and the odd addressed pages are placed in the bottom sub-entries 402b, 404b and 406b.

In the example shown in FIG. 4, each TLB entry 402, 404 and 406 comprises a single sub-entry, 402a, 404a and 406b, as no adjacent pages are currently mapped. As shown by the top column in FIG. 4, each TLB entry comprises a virtual address 408, a corresponding physical address 410, a valid bit 412, a page size 414 and a process TLB ID (PID) 416. Note that a PID is necessary because the TLB is shared system-wide. In this example the PID field indicates that all three TLB entries belongs to the same process, namely, PID1.

Accordingly, in this example, the sub-entry 402a comprises a translation from a virtual address of 0 to physical address $PFN_1$. The valid bit indicates that the entry is valid and the page size for this entry is 16 KB. Likewise, the sub-entry 404a comprises a translation from a virtual address of 2 M to a physical address of $PFN_2$. The valid bit indicates that this entry is valid and the page size is 1 MB. Note that for this large page entry, both the virtual address and the physical address are on a boundary that coincides with the page size, in this case, a 1 MB boundary.

The third sub-entry in this example comprises a translation from a virtual address of HIADDR-16 K to physical address of PFN3. The valid bit indicates that the entry is valid and the page size is 16 K. The term 'HIADDR' is generally used to indicate the highest virtual address and is typically an even address. Accordingly, the address HIADDR—16 K is an odd address. Thus, the entry for this virtual address is placed in the lower sub-entry 406b.

It should be noted that if mapped data is moved (or "migrated") from a first page in memory to a second page in memory, any copies of page table entries that reference the memory page, including copies placed in a TLB, must be flushed or invalidated. PTEs that reference the first page are generally updated to reference the second page. If mapped data is deleted, page table entries that reference the page are typically invalidated.

Figure 5:
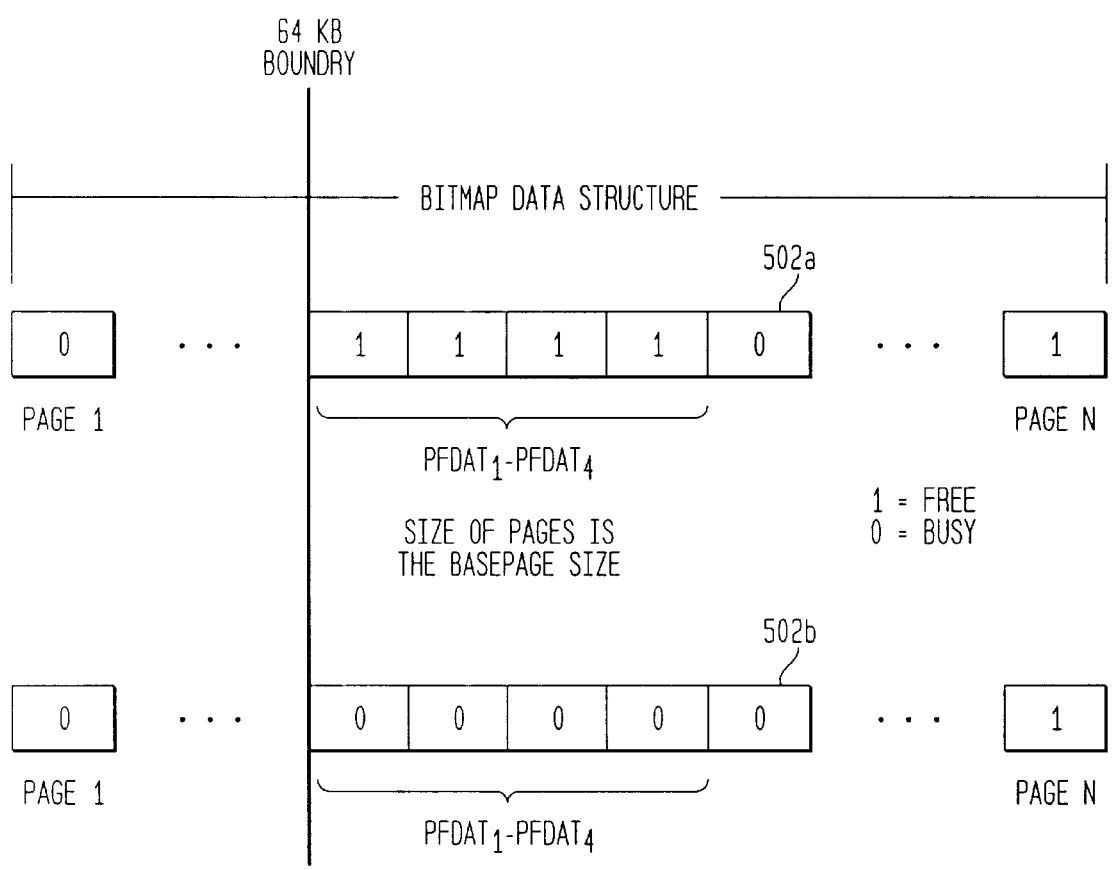
FIG. 5 is a block diagram depicting a memory bit map according to a preferred embodiment of the present invention.

FIG. 5 depicts a bitmap data structure (hereinafter "bitmap") that is used in a preferred embodiment of the present invention for searching and documenting base sized memory pages that are free and busy. Preferably, the bitmap 502a represents memory in base page size segments. A base page size is defined as the smallest page size that is available for application programs. Typically, 4 KB or 16 KB is defined as a base page size. However, the actual base page size definition depends on each specific implementation of the present invention. In the examples used herein, it is assumed that a 16 KB base page size is defined.

As shown by the bitmap 502a, all memory available to processes (generally, all random access memory), is represented by the bitmap 502a Note that for NUMA computer systems, one bitmap is constructed for each node in the NUMA system.

Accordingly, each 16 KB portion of memory is represented by a single bit in the bitmap. In a preferred embodiment, the bitmap 502a is used instead of the PFDATs to search for available memory. In this fashion, because the bitmap only contains one bit for each base page, searching the bitmap for free memory is much faster than searching each PFDAT. As shown in FIG. 5, free pages are preferably represented by set bits and busy pages are represented by cleared bits.

An example of a process that can be used to search for free memory using the bitmap 502a, according to a preferred embodiment of present invention, will now be described with concurrent references to FIGS. 5, 6 and 7.

Figure 6:
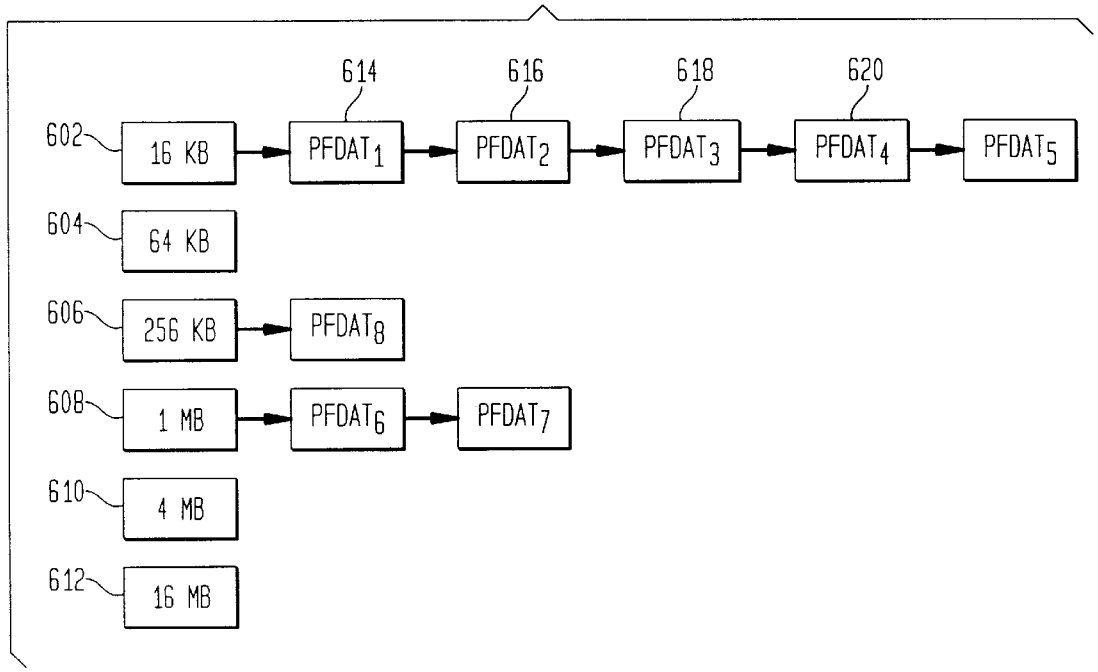
FIGS. 6–7 are block diagrams depicting a set of freelists having various page sizes according to a preferred embodiment of the present invention.

FIG. 6 is a block diagram depicting a set of freelists. A freelist is a linked list of PFDATs that represent memory pages that are currently free (i.e. not being used by any processes). Preferably, separate freelists are created for each page size defined for the system. Any number of freelists can be created depending on the pages sizes defined for each specific implementation of the present invention. For example, suppose an implementation of the present invention only defines two page sizes, namely a base page size and a large page size. In this example, two corresponding freelists are created, one to represent the base page size and one to represent the large page size.

In the example depicted in FIG. 6, six freelists are depicted. The six freelists, 602, 604, 606, 608, 610 and 612 represent free memory pages for different memory page sizes of 16 KB, 64 KB, 256 KB, 1 MB, 4 MB and 16 MB, respectively. Note that in a multi-node computer system, such as a NUMA computer system, a set of freelists are preferably generated for each node.

Accordingly, when a process requests a memory page (i.e. in a memory allocation request), the operating system searches the appropriate freelist to determine if any such pages are free. If an entry is found in the appropriate freelist, the PFDAT associated with the free memory page is returned to the requesting process.

Referring back to FIG. 6, the first freelist 602 comprises a linked list of PFDATs, such as the PFDATs 614–620. In this example, the freelist 602 represents a list of free base pages (in this case 16 KB pages). Thus, as can be seen by FIG. 6, five 16 KB base pages (PFDAT$_1$–PFDAT$_5$) are currently available. Similarly, the freelist 604 represents a list of free 64 KB pages. The 64 KB freelist 604 currently has zero pages available. The 256 KB freelist 608 currently has one page available, namely PFDAT$_8$. The 1 MB freelist 608 currently has 2 free pages available, namely PFDAT$_6$ and PFDAT$_7$. The remaining freelists, namely the 4 MB 610 and 16 MB 612 lists, have zero memory pages available.

Figure 7:
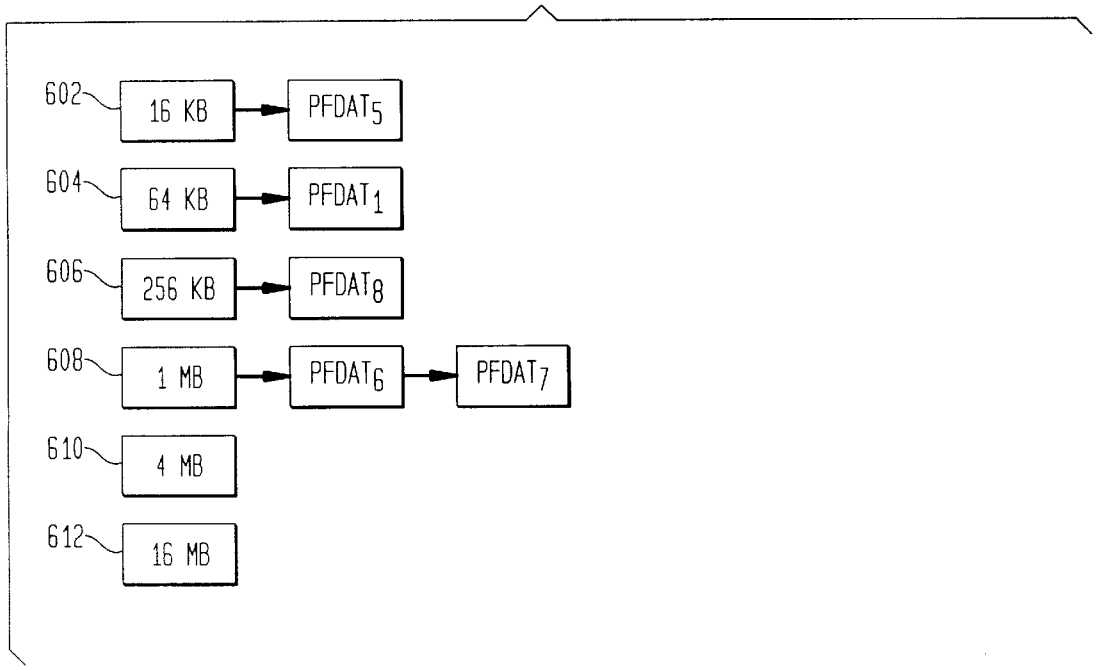

The following is a simplified example to illustrate the preferred use of the freelists as shown in FIGS. 6 and 7, and the bitmaps as shown in FIG. 5, to coalesce a free memory page according to a preferred embodiment of the present invention. Suppose a process requests a 64 KB memory page. In this case, the operating system checks the 64 KB freelist 604 for a free memory page. Note that in a preferred embodiment, the header of each freelist 602–612 comprises a count indicating the number of pages currently stored in the list. Thus, the actual freelist need not be traversed to determine if any entries exist.

Accordingly the operating system finds that there are no free memory pages within the 64 KB freelist 604 (FIG. 6). Thus, the operating system searches the bitmap 502a for a free 64 KB page. Note that in this example, instead of coalescing the bitmap for a free large page as described below, the operating system could check the larger freelist (i.e. the 256 KB list 608) for a free page. If one is present, as in this example, the operating system can use a splitting algorithm to split up the 256 KB entry into four 64 KB entries. Details pertaining to a preferred splitting algorithm is described later in this disclosure.

As stated, a preferred method for allocating large pages for application program processes is referred to herein as a "Coalescing Daemon". The use of this term is for exemplary purposes only and should not be construed to limit the scope and breadth of the present invention.

Referring back to the example above, because a free 64 KB memory page is not found within the 64 KB freelist 604 (and the splitting algorithm is not used), the Coalescing Daemon begins to search for an area in memory that can be used to allocate the large 64 KB page. This is accomplished by searching the bitmap 502a as shown in FIG. 5. Accordingly, in this example, the Coalescing Daemon scans the bitmap 502a to look for 4 contiguous free base pages (i.e. 4 * 16 KB{base page size}=64 KB).

However, in a preferred embodiment, the Coalescing Daemon searches the bitmap only at 64 KB boundaries. That is, large pages can only be allocated at a physical and virtual address boundary that corresponds with the page size. This is typically the case for most computer systems because both page tables and TLBs require this condition. For example, 16 KB pages are allocated at 16 KB boundaries, 64 KB pages are allocated at 64 KB boundaries, and so on.

Accordingly, as indicated by FIG. 5, the Coalescing Daemon finds 4 bits that are set at a 64 KB boundary. This represents a suitable chunk of memory that can be designated as a 64 KB page. In this example, the 64 KB page is represented by PFDAT$_1$—PFDAT$_4$.

Accordingly, referring now to FIG. 6, the 4 freelist entries 614, 616, 618 and 620, that represent PFDAT$_1$, PFDAT$_2$, PFDAT$_3$, and PFDAT$_4$, respectively, are removed from the freelist 602. This is shown in FIG. 7. Also shown in FIG. 7 is that the first PFDAT in the large page, namely PFDAT$_1$ is inserted in the 64 KB freelist 604. A field within the PFDAT$_1$ is used to indicate that this PFDAT now represents a 64 KB page comprising the physical base page associated with this PFDAT, plus 3 additional contiguous base pages.

Note that in a preferred embodiment, each PFDAT corresponds with a page of memory equal to the base page size. This relationship is preferably maintained even when large pages are allocated in order to simplify operating system programming. This relationship is fully detailed in the commonly owned co-pending U.S. Patent application entitled, "Method, System and Computer Program Product for Virtual Memory Support for Managing Translation Look Aside Buffers with Multiple Page Size Support", attorney docket no. 15-4-461.00, filed concurrently herewith and incorporated in its entirety by reference.

Once the operating system allocates the 64 KB page of memory to a process making a memory request, the bits in the bitmap are cleared, as shown in FIG. 5 (bitmap 502b), and the newly created 64 KB freelist entry is deleted (not shown).

As stated, the above example, which describes one aspect of the Coalescing Daemon, is a simplified one. In the preferred embodiment, the Coalescing Daemon is a process that runs in the background and is preferably part of the operating system. Hence the name "daemon", which is defined as a program that is not invoked explicitly, but lies dormant waiting for some condition(s) to occur. As will be described below in some detail, the Coalescing Daemon is not necessarily executed in response to a memory allocation request, as suggested above, (although it can be woken up in response to such a request), but is preferably executed continuously to build freelists so that memory pages are available when needed.

Figure 8:
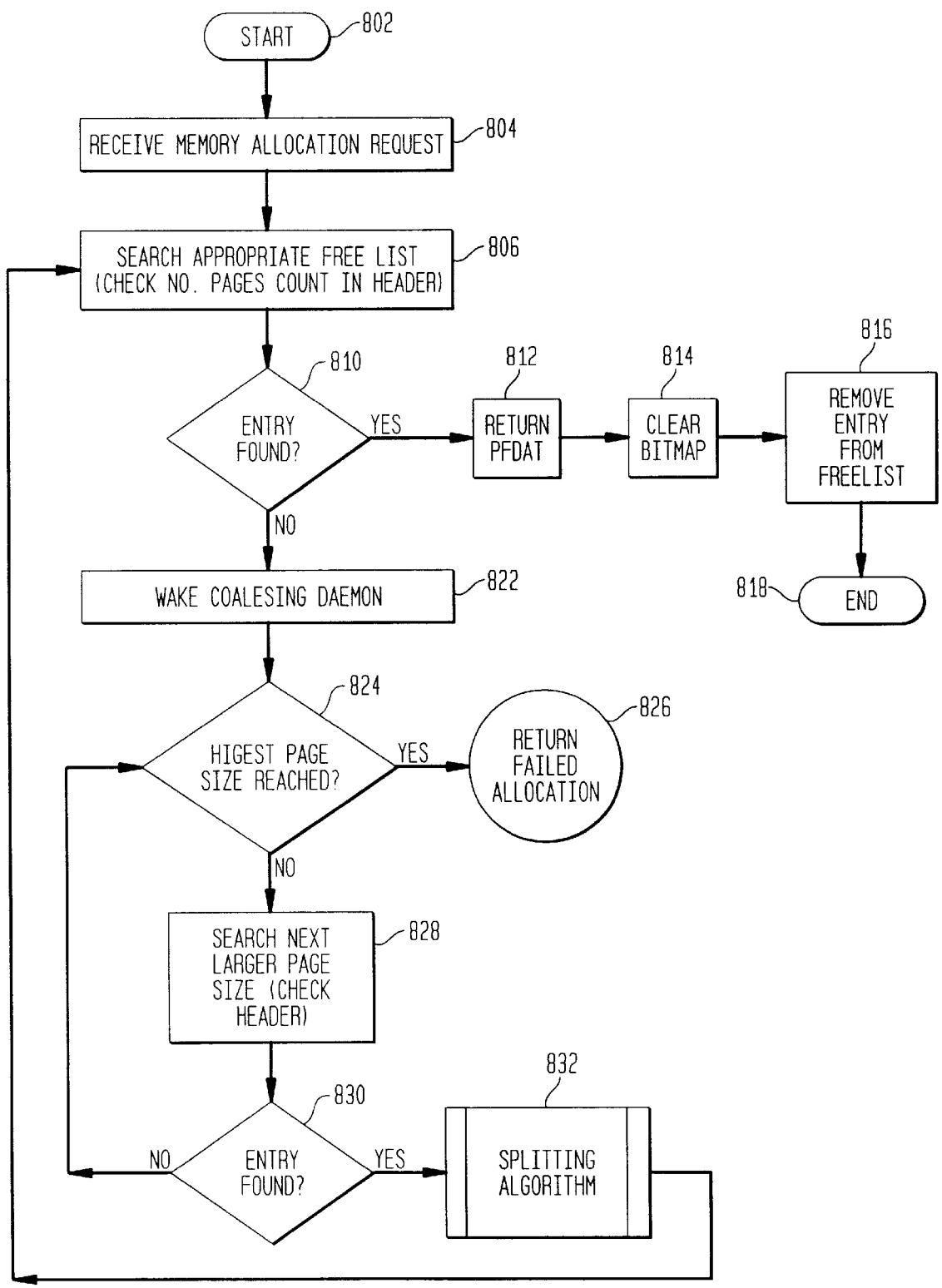
FIG. 8 is a flowchart depicting a process that can be used for memory allocation according to a preferred embodiment of the present invention.

An example of a method that can be used to allocate memory according to a preferred embodiment of the present invention, will now be described with reference to FIG. 8. The method begins with step 802, where control immediately passes to step 804. In step 804 the operating system receives a memory allocation request from a process. The request includes a memory page size. Once the request is received, control passes to step 806.

In step 806, the operating system searches the freelist, such as freelist 604, for an entry. Preferably, the header of the freelist is checked (i.e. the number of pages count), to see if any entries exist within the particular freelist. As indicated in step 810, if an entry exists control passes to step 812. In step 812, the operating system returns the associated PFDAT to the process making the request. Next, in step 814 the bitmap entry or entries associated with the memory page is cleared. Next in step 816, the entry is removed from the freelist. The process then ends as indicated by step 818.

If an entry in the freelist is not found in step 810, control passes to step 822. In step 822, the Coalescing Daemon is woken up. A detailed description of a process that can be used for the Coalescing Daemon is described below with reference to FIGS. 11–14. Control then passes to step 824.

In step 824, the method determines if the highest page size has been reached. In this case, because it is the first pass within the loop represented by steps 824–830, the method determines whether the page size requested is the largest page size defined by the system. If so, then there is no possibility of splitting up a larger free memory page into a number of smaller pages and the process ends in step 826. Further, as indicated by step 826, the method returns with an indication that the memory request had failed.

It should be noted that upon receipt of a memory allocation failure, the requesting process may either immediately or after an interval, try the memory allocation again. The second attempt may be successful because the Coalescing Daemon, which was woken up in step 822, may have been successful in allocating a memory page. Of course, another process may have also freed up some memory in the interim. Alternatively, the requesting process may attempt to allocate a smaller memory page.

If, in step 824, it is determined that the highest page was not reached, the method searches the freelist associated with the next larger page size. If an entry is found, a splitting algorithm (described below) is executed as indicated by step 832. If not, steps 824 through steps 830 are repeated until either an entry is found (steps 830 and 832), or the highest page is reached and the memory allocation fails (steps 824 and 826).

Figure 9:
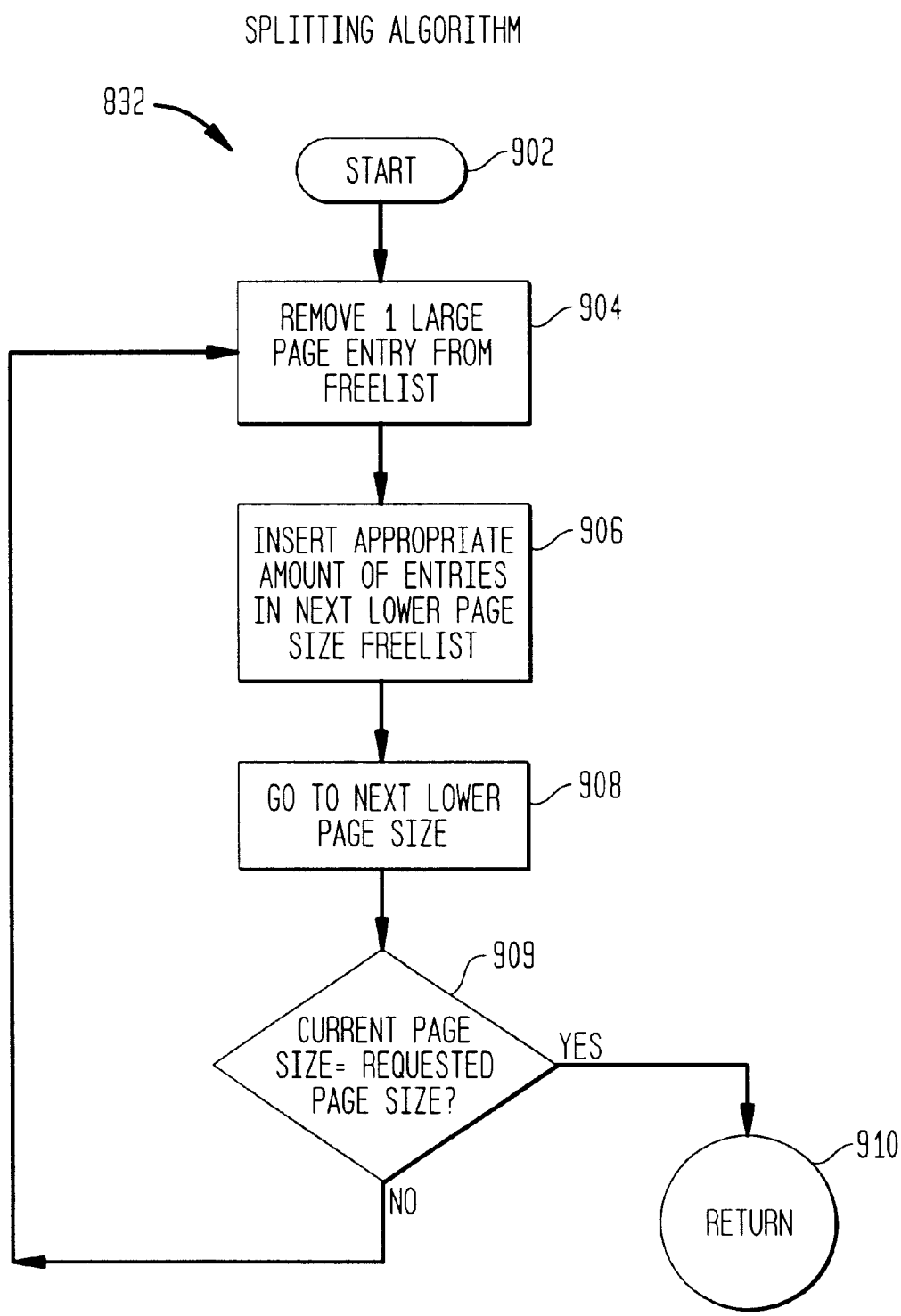
FIG. 9 is a flowchart depicting a process that can be used as a splitting algorithm according to a preferred embodiment of the present invention.

An example of a method that can be used as a splitting algorithm (step 832) will now be described with reference to the flowchart in FIG. 9. This method splits larger free pages into a number of smaller free pages. However, if the larger free page is not the next larger page size than the requested page, the larger page is distributed among the freelists having page sizes between the two.

For example, suppose a 64 KB page is requested. Further suppose that there are no free pages in the next higher (256 KB) freelist However, a free page is found in the next higher (1 MB) freelist. Thus, instead of splitting up the 1 MB page into sixteen 64 KB pages, the 1 MB page is split into 4 256 KB pages. Then one of the 256 KB pages is split into four 64 KB pages. In this fashion, the entries in the freelist are distributed more evenly which increases overall efficiency and performance.

Accordingly, the splitting algorithm begins with step 902, where control immediately passes to step 904. In step 904, one page is removed from the current freelist (as determined by the memory allocation method in FIG. 8). Control then passes to step 906.

In step 906, an appropriate amount of entries are inserted into the freelist associated with the next lower page size. In a preferred embodiment, and in the examples used herein, this number will always be 4. For example, in a system that defines 16 KB (base page size), 64 KB, 256 KB, 1 MB, 4 MB and 16 MB page sizes, each page size is larger than the previous page size by a factor of 4.

Next in step 908, the current page size is decremented to the next lower page size. In step 909, the method determines if the current page size is equal to the requested page size. If so, the splitting process is complete and returns to the calling process, as indicated by step 910.

If the current page size is greater than the requested page size, then control passes back to step 904. Next, steps 904–909 are repeated, whereby each large page freelist entry is split into a number entries in smaller page freelists (steps 904–906), until the requested page size is reached.

Figure 10:
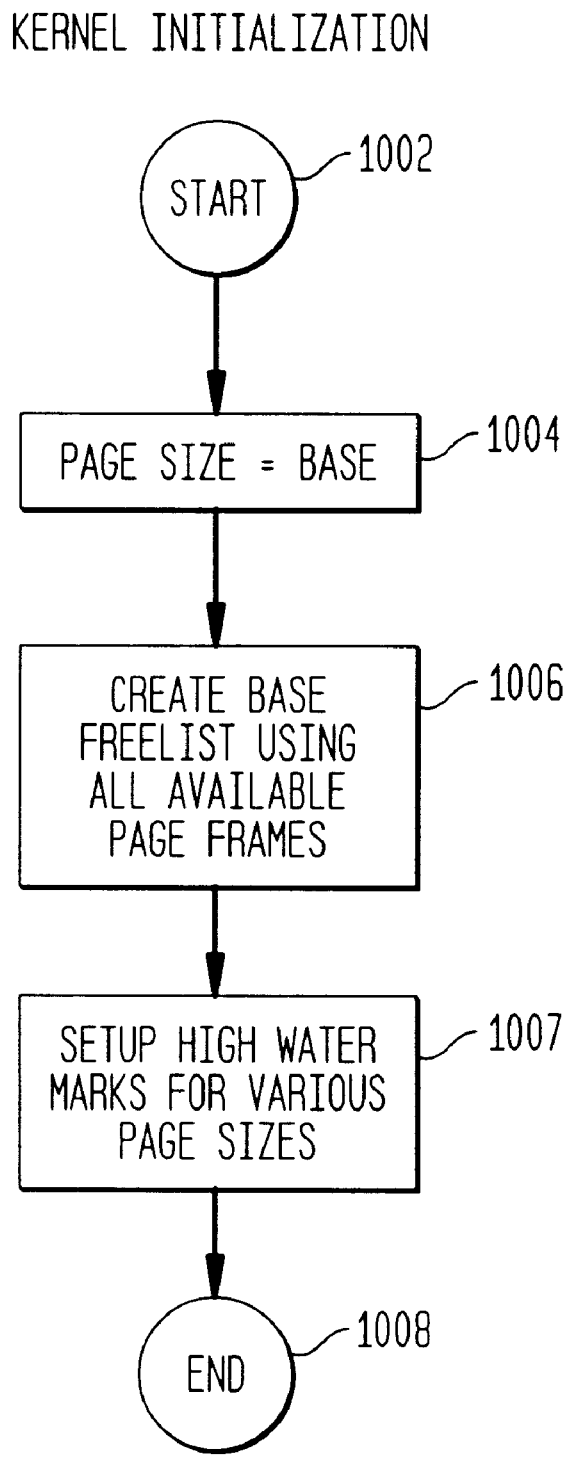
FIG. 10 is a flowchart depicting a process that can be used to initialize the kernel of an operating system according to a preferred embodiment of the present invention.

FIG. 10 is a flowchart depicting a process that can be used as part of an initialization routine, preferably in an operating system kernel, to construct a base page size freelist and set up the high water marks for memory pages of various sizes. As FIG. 10 indicates, in the preferred embodiment of the present invention, a base page freelist is created upon initialization of the kernel, in which a base page size freelist is created that uses all of the free memory in the computer system. For a NUMA system, this is performed on a node basis.

A The method begins with step 1002, where control immediately passes to step 1004. In step 1004, the page size is set to the base page size. As previously noted, the base page size is typically either 4 KB or 16 KB. However the base page size can be any value, smaller or larger then these exemplary values. The values chosen for the base page size depends on each specific implementation of the present invention.

Next in step 1006, a base page size freelist is constructed using all of the memory available to processes. Next control passes to step 1007. In step 1007, high water marks are set-up for each page size defined by a system administrator or the like. Accordingly, high water marks are specified to the operating system. During the initialization routine in FIG. 10, these high water marks are set up by the operating system so that later they can be used by the Coalescing Daemon to allocate a number of free memory pages for each specified page size. For example, if a user typically runs large database programs, they may want to specify that a large portion of the system memory should be allocated to large memory pages. For example, a specification may designate that 20% of system memory is to be allocated in 16 KB pages, 20% in 256 KB pages, 30 in 1 MB pages and 30% in 16 MB pages. The method ends in step 1008.

FIGS. 11–16 are examples of methods that can be used to implement the Coalescing Daemon, a page free and a migration algorithm according to a preferred embodiment of the present invention. The pseudo code depicted in FIGS. 11–15 is self explanatory and would be apparent to persons skilled in the relevant art(s). However, included below is a detailed description of the various functions presented in the FIGS. 11–15. Note that for each procedure, a set of parameters are included. These parameters are included to illustrate the variables, data structures, etc., that are used by the particular component. It is not intended to be suggested that these parameters are necessarily passed by the calling procedure. In some intances these parameters are passed but in others they may be global and/or local variables that are accessible within the procedure.

The following is a brief description of symbols that are used in the pseudo code in FIGS. 11–16:

| | |
|---|---|
| "{" | indicates the BEGINNING of a loop, function, if statement, else statement, etc. |
| "}" | indicates the END of a loop, function, if statement, else statement, etc. |
| "=" | used to assign a value to a variable. |
| "==" | EQUAL TO |
| "!=" | NOT EQUAL TO |
| "\|\|" | Boolean OR |
| ">" | GREATER THAN |
| "<=" | LESS THAN OR EQUAL TO |
| "if (X)" | the statements that appear between the "{" and "}" are executed if X is TRUE. If one statement only is associated with the if statement, the "{" and "}" are not used. |

The procedures presented in FIGS. 11–14 will now be described at a high level, followed by a detailed description of each function. The coalesced function in FIG. 11, is the main Coalescing Daemon procedure. It sets the appropriate policy (i.e. strong, mild or weak), and calls the coalesce_engine procedure (FIG. 12) a number of times according to the policy. The coalesce_engine procedure in FIG. 12 controls the traversal of the bitmap 502*a* in chunks equal to the largest page size (in this example, in 16 MB chunks). For each 16 MB chunk, the coalesce_engine calls the coalesce_chunk procedure (FIG. 13). The coalesce_engine policy ends when all high water marks are reached, or all of the memory has been traversed (i.e. the last base sized memory page is reached, see Page N in FIG. 5).

The coalesce_chunk procedure calls the coalesce_leaf_chunk procedure and attempts to allocate pages within the 16 MB chunk as defined by the coalesce_engine procedure. It attempts to allocate the largest needed pages first, and then attempts to allocate smaller pages in order of their page size (larger pages first).

The coalesce_leaf_chunk procedure (FIG. 14), performs the actual weak, mild and strong coalescing policies. That is, in coalesce_leaf_chunk, the bitmap is searched for free contiguous chunks of memory, memory pages are migrated if necessary (using the strong or mild policies) to create free memory chunks, and freelists are updated if successful.

In a preferred embodiment, the Coalescing Daemon allocates large memory pages using a weak, mild and strong coalescing policy which are preformed in that order. That is the weak policy is performed first, followed by the mild and the strong policy. The main function, namely coalesced (FIG. 11), controls which policy is used. The mild and strong policies are performed only if the preceding policy or policies fail.

In FIG. 11, lines 1102–1108 define global variables used by the Coalescing Daemon. Specifically, the base page size, the largest page size 1102, the first PFN 1104 and the last PFN are defined. A constant defining the number of tries is defined in line 1105. Constants are also defined to identify the weak, mild and strong coalescing policies (1106–1108).

The main function of the Coalescing Daemon, namely coalesced, begins on line 1109. As can be seen by line 1112, this routine runs continuously (however, it sleeps for predetermined intervals as indicated by lines 1123, 1132 and 1135).

As lines 1113–1114 indicate, if a process is waiting for a large memory page, the method automatically defaults to the strong policy. The fact that a process (or more than one process), is waiting for a large page, indicates that memory is low and a strong coalescing policy is needed to allocate the required memory page(s).

Otherwise the method defaults to the weak policy (line 1115). The number of loops in which the coalescing engine (line 1121) is called is determined by the "number of tries" variable. As can bee seen by lines 1117–1119, the weak and mild policies are tried 5 times and the strong policy is tried once. If upon return from the coalescing engine (line 1121) all high watermarks are reached, then all freelists have been successfully created and the Coalescing Daemon sleeps (line 1123). Typically, the Coalescing Daemon sleeps until woken (see lines 1135–1136). Once woken, the Coalescing Daemon begins again from the beginning (line 1111). An example of an instance in which the Coalescing Daemon is woken up is when a large memory page is not found within the freelist during memory allocation, as previously described with reference to FIG. 8 (see step 822).

If all freelists have not been created according to the high water marks, the number of tries variable is decremented and additional loops are performed if the number of tries is still greater than zero. Otherwise, the policy type is upgraded (see lines 1126–1131). That is the weak policy is upgraded to the mild policy, the mild policy is upgraded to the strong policy. If the strong policy is already in force, the weak policy is tried next.

FIG. 12 is an example of a method that can be used for the coalescing engine (line 1121), according to a preferred embodiment of the present invention. As stated, the coalesce_engine procedure controls the traversal of the bitmap 502*a* in chunks equal to the largest page size (in this example, in 16 MB chunks). For each 16 MB chunk, the coalesce_engine calls the coalesce_chunk procedure (FIG. 13).

The coalesce_engine first sets a pointer, the "current chunk" to the first page frame number (i.e. page 1 in FIG. 5), in line 1205. This is where the search though the bitmap 502a begins. In addition, a variable used to keep track of the current page size is set to the largest page size defined for the system (line 1204). Note that in this case, the variable "current_pagesize" is local. In the examples discussed above, the largest page size is 16 MB (see freelist 612 in FIG. 6).

The while loop beginning on line 1206 proceeds until the "current chunk" is less than or equal to the last PFN (i.e. page N in FIG. 5). That is, until all of the bitmap 502a is searched. In addition, if all high water marks are reached, the coalesce_engine breaks out of the while loop and returns to the main (coalesced) function (lines 1209–1210).

In the while loop, coalesce_chunk is called (FIG. 13). Upon return from coalesce_chunk, the current chunk pointer is incremented so that it points to the next chunk of the largest page size.

FIG. 13 is an example of a method that can be used for the coalesce_chunk according to a preferred embodiment of the present invention. Note that this method is recursive in that it calls itself in line 1310. First, in line 1305, coalesce_leaf_chunk is called find a free memory page. As will be described with reference to FIG. 14, coalesce_leaf_chunk is the procedure that does the actual weak, mild and strong coalescing policies. That is, in coalesce_leaf_chunk, the bitmap is actually searched, memory pages may be migrated if needed, and freelists are updated if a requested memory page is successfully found (or created).

Referring back now to FIG. 13, coalesce_chunk first checks to see if the high water mark is reached for the current page size. Note that current page size variable is local to this procedure and does not correspond with the variable of the same name in coalesce_engine (FIG. 12), which is always set to the largest pagesize. If the high water mark is reached for the current page size or coalesce_leaf_chunk is unsuccessful, the procedure defaults to the next lower page size (line 1308). Notice that the procedure defaults to the next lower page size if any one of the preceding two conditions are true.

In the first instance, the high water mark has been reached for the current page size. Thus, there is no longer any need to find free memory pages of that page size. Accordingly the method attempts to find free memory pages of the next lower page size. The second instance occurs when there are no longer any pages available in the current 16 MB (largest page size) chunk that is being interrogated. Thus, the procedure tries to find other needed pages within that 16 MB chunk of lower page sizes.

Accordingly, a number of pages parameter (npgs, line 1307) is set to reflect the number of pages in the next smaller page size that are needed to equal the larger page size. For example, if a 16 MB page was the current page size, and either the high water mark was reached or a 16 MB page could not be found, the process attempts to find four 4 MB pages in the current 16 MB chunk. As indicated by line 1312, the current 16 MB chunk is traversed in increments of the next smaller page size (in this example, 4 MB).

The coalesce_leaf_chunk returns with a single boolean value of either SUCCESS or a FAILURE. A return value of SUCCESS indicates that the procedure was successful in adding an entry in the requested freelist. A return value of FAILURE indicates that an entry could not be added to the requested freelist.

FIG. 14 is an example of a method that can be used for the coalesce_chunk_leaf procedure according to a preferred embodiment of the present invention. As stated, the coalesce_leaf_chunk procedure performs the weak, mild and strong coalescing policies. That is, in coalesce_leaf_chunk, the bitmap is searched for free contiguous chunks of memory, memory pages are migrated if necessary (using the strong or mild policies) to create free memory chunks, and freelists are updated if successful.

Specifically, the weak policy (lines 1410–1420) searches the bitmap for a particular number of consecutive free bits (line 1411). The number of free bits to search for is determined in line 1407, where N is set to the current page size divided by the base page size. For example if a 256 KB page is being sought, and a base page of 16 KB is defined, N is set to 256/16 or 16. Thus, beginning at the current chunk (set by coalesce_engine line 1208, or coalesce_chunk line 1312), the method checks the bitmap for 16 consecutive free base pages (line 1411). If such a chunk of free memory is found, the corresponding entries are removed from the lower page size freelists (line 1412) and the first entry is added to the requested page size freelist (line 1415). The method then returns the boolean value of SUCCESS (line 1418). If a free chunk could not be found, the method returns the boolean value of FAILURE (lines 1419–1420).

The mild policy begins on line 1421. The mild coalescing policy attempts to find a suitable chunk of memory (according to a specified criterion, described below), which is used to create a contiguous chunk of free memory by migrating busy base pages to other areas of memory.

Specifically, in the mild coalescing policy, the bitmap is searched for a chunk of memory in which the set bits (i.e. the free base pages) are above a predetermined threshold amount (lines 1422–1423). In this fashion, the operating system attempts to perform only a limited amout of migration in order to speed up the overall process. The maximum amount of migration that is performed using the mild coalescing policy depends directly on the predetermined threshold amount that is specified for the page size.

The predetermined threshold amount is preferably, a tunable parameter that can be specified by an operating system, a user, a compiler, or another programming tool. If a suitable chunk is found using the mild coalescing policy, the busy pages within the chunk are moved to an area of memory outside of the chunk using a migration policy (1428–1429) and the appropriate freelists are modified (lines 1426–1427 and 1430–1432). Note that is some cases, pages cannot be migrated. For example, they may be locked by the operating system Kernel or by an application program. In this case, the method returns with a failure indicator (lines 1424–1425). The mild coalescing policy ends with either a success or a failure indicator (lines 1432–1434).

The strong coalescing policy begins on line 1435. In the strong coalescing policy, base pages are migrated regardless of a threshold amount. That is, the strong policy attempts to free up a contiguous chunk of memory having the requested page size, regardless of how many pages need to be migrated (1440–1441). However, if pages cannot be migrated, the method returns with a failure indication (lines 1436–1437). Note that this is the only condition, in this example, in which the strong policy can fail.

If pages can be migrated, lines 1438–1444 are executed to remove the PFDATs corresponding with the free bits from the lower page size freelists, migrate the busy pages, update the appropriate freelists, and return with a success indicator.

Accordingly, by using a three pass method (i.e. the weak, mild and strong policies), the Coalescing Daemon allocates a large memory page dynamically in the most efficient manner possible, depending on the current system state.

In one embodiment of the present invention, an attempt is made to find free large memory pages whenever a process frees a memory pages. That is, as part of a "pagefree" routine, the operating system can use this opportunity to look for chunks of memory that are now suitable as a large page. Accordingly, FIG. 15 is an example of a pagefree routine that looks for large memory pages in this fashion.

The method begins by freeing the specified memory page. In addition to other functions that are not relevant to the present invention (as indicated by lines 1504 and 1507), the method inserts the associated PFDAT into the corresponding freelist and sets the corresponding bit(s) in the bitmap (lines 1505–1506). Next in line 1508, the current page is set to the largest page size. That is, the method attempts to find the largest free memory page possible, in response to the pagefree request. Next, a while loop begins on line 1509. The while loop continues while the current page size is not equal to the freed page size.

Next as line 1510 indicates, if a high water mark for the current page size has not been reached, the bits adjacent to the freed memory page are scanned for a suitable large memory page of the current page size. If one is found, the corresponding freelists are modified (lines 1514–1517) and the method ends as indicated by line 1517.

If, however, a suitable large page is not found in the adjacent bits, the page size is decremented to the next lower page size (line 1520), and the process is repeated (lines 1510–1521).

FIG. 16 is an example of a method that can be used for the migrating a list of pages for the Coalescing Daemon as needed in the mild and strong policies. First it is assumed that the Coalescing Daemon creates a list of PFDATs, similar to a freelist, that represents the base pages that need to be migrated in order to free up a chunk of memory (line 1603). In a preferred embodiment, the Coalescing Daemon only considers pages that are defined as base pages to be migratable. This is so because, it is generally not an advantage to migrate pages larger than the base page size.

The while loop in line 1607 continues until the Current PFDAT list has been traversed (i.e. NULL is reached). In line 1608 a new memory page is allocated. Note that as part a preferred allocation routine, a user can specify whether or not the splitting algorithm should be used (See FIG. 9). In this case, when a new PFDAT is allocated, it is specified that large pages should not be split into smaller pages in order to conserve the large pages in the system.

Next as lines 1610–1611 indicates, the current PFDAT is removed from its memory object cache and the new PFDAT is inserted into the memory object cache. In line 1612 the reverse map field (see FIG. 2, 202) in the current PFDAT is used to identify entries in page tables that are using the PFDAT that is being migrated. Next, those PTEs are invalidated and the reverse maps field(s) are copied from the current PFDAT to the new PFDAT (lines 1614–1615).

Next, a new page frame number is retrieved so that the method can update the associated PTEs with the proper physical page address associated with the new PFDAT (lines 1616–1617). The new PFDAT is next inserted into a new PFDAT list (to be used below). The new PFDAT list is a linked list, similar to a freelist, comprising all of the new PFDATs that have been migrated from their original locations according to the Current PFDAT list from line 1603. The next PFDAT in the current PFDAT list is set to current_pfdat variable, and the lines 1608–1619 are repeated as described above. This continues until all PFDATs in the current PFDAT list have been operated upon (i.e., the current_pfdat variable is NULL).

Next in line 1621 the method performs a TLB flush. Note that by using this method of migrating using PFDAT lists, only one TLB flush is needed. Because TLB flushes are costly, it is advantageous to limit them as much as possible. This is an improvement over conventional methods that tend to flush the TLB in response to each memory page migration.

In lines 1622–1623, both the new and the current PFDAT lists are initialized to the first entry. Next the while loop in lines 1624–1631 is performed. In this while loop the current PFDAT list comprising the PFDATs that are to be moved, is simultaneously traversed along with the new PFDAT list. As each entry in the two lists are traversed, the actual data from the original memory page is copied into the new memory page, and the PTEs associated with the new memory pages are now validated (lines 1626–1628). This process is repeated until both lists are exhausted (i.e. until the current_pfdat variable=NULL) (line 1624).

Note that between the time that the PTEs are invalidated (line 1614) and the PTEs are again validated (line 1628), any process that references the memory page will be temporarily put to sleep by the operating system and woken up when the migration is completed.

Figure 17:
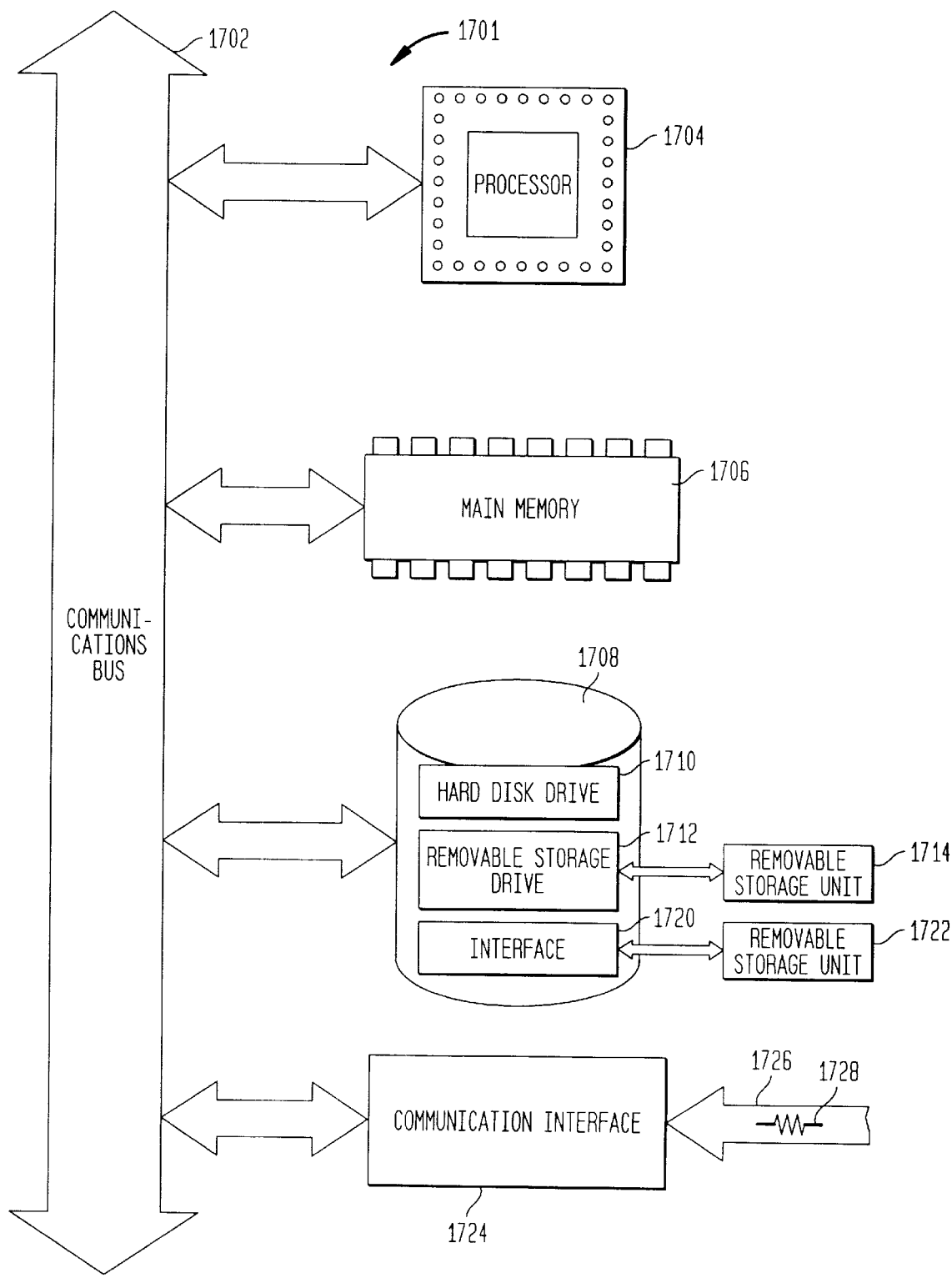
FIG. 17 is a block diagram of a computer that can be used to implement components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1701 is shown in FIG. 17. The computer system 1701 includes one or more processors, such as processor 1704. The processor 1704 is connected to a communication bus 1702. Various software embodiments are described in terms of this example computer system. After reading this description, it will become apparent to a person skilled in the relevant art how to implement the invention using other computer systems and/or computer architectures.

Computer system 1702 also includes a main memory 1706, preferably random access memory (AM), and can also include a secondary memory 1708. The secondary memory 1708 can include, for example, a hard disk drive 1710 and/or a removable storage drive 1712, representing a floppy disk drive, a magnetic tape drive, an optical disk drive, etc. The removable storage drive 1712 reads from and/or writes to a removable storage unit 1714 in a well known manner. Removable storage unit 1714, represents a floppy disk, magnetic tape, optical disk, etc. which is read by and written to by removable storage drive 1712. As will be appreciated, the removable storage unit 1714 includes a computer usable storage medium having stored therein computer software and/or data.

In alternative embodiments, secondary memory 1708 may include other similar means for allowing computer programs or other instructions to be loaded into computer system 1701. Such means can include, for example, a removable storage unit 1722 and an interface 1720. Examples of such can include a program cartridge and cartridge interface (such as that found in video game devices), a removable memory chip (such as an EPROM, or PROM) and associated socket, and other removable storage units 1722 and interfaces 1720 which allow software and data to be transferred from the removable storage unit 1722 to computer system 1701.

Computer system 1701 can also include a communications interface 1724. Communications interface 1724 allows software and data to be transferred between computer system 1701 and external devices. Examples of communications interface 1724 can include a modem, a network interface (such as an Ethernet card), a communications port, a PCMCIA slot and card, etc. Software and data transferred via communications interface 1724 are in the form of signals which can be electronic, electromagnetic, optical or other signals capable of being received by communications interface 1724. These signals 1726 are provided to communications interface via a channel 1728. This channel 828 carries signals 1726 and can be implemented using wire or cable, fiber optics, a phone line, a cellular phone link, an RF link and other communications channels.

In this document, the terms "computer program medium" and "computer usable medium" are used to generally refer to media such as removable storage device 1712, a hard disk installed in hard disk drive 1710, and signals 1726. These computer program products are means for providing software to computer system 1701.

Computer programs (also called computer control logic) are stored in main memory and/or secondary memory 1708. Computer programs can also be received via communications interface 1724. Such computer programs, when executed, enable the computer system 1701 to perform the features of the present invention as discussed herein. In particular, the computer programs, when executed, enable the processor 1704 to perform the features of the present invention. Accordingly, such computer programs represent controllers of the computer system 1701.

In an embodiment where the invention is implemented using software, the software may be stored in a computer program product and loaded into computer system 1701 using removable storage drive 1712, hard drive 1710 or communications interface 1724. The control logic (software), when executed by the processor 1704, causes the processor 1704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for dynamically allocating memory pages in a portion of memory within a computer system, said memory pages being of various page sizes from a base page size to a largest page size, said method comprising the steps of:

specifying a plurality of high water marks, wherein each of the high water marks defines a threshold amount for large pages of a given page size; and coalescing the portion of memory for a large memory page of a large page size when the number of memory pages of the large page size is less than the threshold amount for the large page size.

2. A system for dynamically allocating memory pages in a portion of memory within a computer system, said memory pages being of various page sizes from a base page size to a largest page size, said system comprising:

a specifier that specifies a plurality of high water marks, wherein each of the high water marks defines a threshold amount for large pages of a given page size; and a coalescer that coalesces the portion of memory for a large memory page of a large page size when the number of memory pages of the large page size is less than the threshold amount for the large page size.

3. A method for dynamically allocating memory pages in a portion of memory within a computer system, said memory pages being of various page sizes from a base page size to a largest page size, said method comprising the steps of:

creating an empty set of freelists for representing free memory pages, each freelist corresponding to a particular predetermined page size, and each freelist corresponding to a progressively larger page size beginning with the base page size and ending with the largest page size;

searching the portion of memory for free memory pages of the base page size;

inserting a freelist entry into the freelist corresponding to the base page size for each free memory page found in said searching step;

specifying a plurality of high water marks, wherein each of the high water marks defines a threshold amount for large pages of a given page size;

coalescing the portion of memory for a large memory page of a large page size when the number of memory pages of the large page size is less than the threshold amount for the large page size; and updating said set of freelists by adding an entry to the freelist corresponding to the large memory page and deleting associated multiple entries from the freelist corresponding to the base page size, if a free large memory page is coalesced in said coalescing step.

4. The method of claim 3, further comprising the steps of:

creating a bitmap comprising at least one bit for each base page size segment in the portion of memory; and dynamically maintaining bits in the bitmap to represent base pages that are free and base pages that are busy.

5. The method of claim 4, wherein said searching step is performed by searching said bitmap for free base sized pages.

6. The method of claim 4, wherein said coalescing step includes searching said bitmap for a chunk of memory beginning at a boundary aligned with the large memory page, wherein the chunk comprises a plurality of free contiguous base pages that in aggregate, are equal in size to said large memory page.

7. The method of claim 4, wherein said coalescing step includes searching said bitmap for a chunk of memory beginning at a boundary aligned with said large memory page, said chunk equal in size to said large memory page and comprises a number of free base pages above a predetermined threshold value and further comprises busy base pages that are all migratable; and migrating the busy base pages to an area in the portion of memory outside of said chunk.

8. The method of claim 4, wherein said coalescing step includes searching said bitmap for a chunk of memory beginning at a boundary aligned with said large memory page, said chunk equal in size to said large memory page and comprises busy base pages that are all migratable;

migrating the busy base pages to an area within the portion of memory outside of the chunk.

9. The method of claim 4, wherein said coalescing step includes the steps of:
    searching the bitmap for a free chunk of memory beginning at a boundary aligned with the large memory page, wherein the free chunk comprises a plurality of free contiguous base pages that in aggregate, are equal in size to the large memory page;
    if the free chunk is not found, searching the bitmap for a mildly busy chunk of memory beginning at a boundary aligned with the large memory page; and
    if the free chunk and the mildly busy chunk are not found, searching the bitmap for any chunk of memory, beginning at a boundary aligned with the large memory page and having a size equal to the large memory page and comprising busy base pages that are all migratable; and
    migrating the busy pages to an area in the portion of memory outside of a found chunk if either the mildly busy chunk or the any chunk is found;
    wherein the mildly busy chunk is equal in size to the large memory page, and comprises a number of free base pages above a predetermined threshold value, and further comprises busy base pages that are all migratable.

10. The method of claim 4, wherein the computer system is a multi-node computer system comprising a plurality of nodes;
    wherein each freelist further corresponds to a particular page size at one the plurality of nodes; and
    wherein the bitmap further comprises a separate bitmap for each of the plurality of nodes.

11. The method of claim 3 further comprising the step of:
    responding to a page free request by searching an area in the portion of memory associated with the page free request for chunks of memory suitable as an undiscovered free large memory page, and by automatically coalescing the undiscovered free large memory page in response to the page free request;
    whereby said responding step saves the necessity of separately performing said coalescing step for the undiscovered free large memory page.

12. A method for dynamically allocating memory pages in a portion of memory within a computer system, said memory pages being of various page sizes from a base page size to a largest page size, said method comprising the steps of:
    maintaining a set of freelists, each freelist associated with a particular page size and comprising zero or more entries therein, each entry representing a free physical memory page of the particular page size;
    receiving a memory allocation request for a memory page of a large page size from a process;
    determining if a current entry exists in the freelist associated with the large page size;
    allocating, to the process, the free physical memory page associated with the current entry, if the current entry exists;
    searching for a larger entry in the freelist associated with a next larger page size, if the current entry does not exist;
    splitting the larger entry, if the larger entry is found in said searching step, said splitting step comprising the steps of
        (a) removing the larger entry from the freelist searched in said searching step as a selected entry,
        (b) inserting an appropriate amount of entries in a freelist corresponding to a next lower page size of the selected entry,
        (c) determining whether the next lower page size is the large page size,
        (d) if said determining step determines the next lower pape size is not the large page size, then choosing one of the appropriate amount of entries as the selected entry and removing the selected entry from the freelist corresponding to a next lower page size, and
        (e) repeating said steps (b), (c), and (d) until a freelist associated with the large page size is referenced in said inserting step; and
    repeating said searching and splitting steps until a freelist of the largest page size is searched or the larger entry is found in said searching step.

13. The method of claim 12, wherein the computer system is a multi-node computer system comprising a plurality of nodes, and wherein each freelist further corresponds to a particular page size at one the plurality of nodes.

14. A system for dynamically allocating memory pages in a portion of memory within a computer system, said memory pages being of various page sizes from a base page size to a largest page size, said system comprising:
    a freelist creator that creates an empty set of freelists for representing free memory pages, each freelist corresponding to a particular predetermined page size, and each freelist corresponding to a progressively larger page size beginning with the base page size and ending with the largest page size;
    a searcher that searches the portion of memory for free memory pages of the base page size;
    an inserter that inserts a freelist entry into the freelist corresponding to the base page size for each free memory page found by said searcher;
    a specifier that specifies a plurality of high water marks, wherein each of the high water marks defines a threshold amount for large pages of a given page size;
    a coalescer that coalesces the portion of memory for a large memory page of a large page size when the number of memory pages of the large page size is less than the threshold amount for the large page size; and
    an updater that updates the set of freelists by adding an entry to a freelist corresponding to the large memory page and deleting associated multiple entries from a freelist corresponding to the base page size, if a free large memory page is coalesced by said coalescer.

15. The system of claim 14, further comprising:
    a bitmap creator that creates a bitmap comprising at least one bit for each base page size segment in the portion of memory; and
    a maintainer that dynamically maintains bits in the bitmap to represent base pages that are free and base pages that are busy.

16. A system for dynamically allocating memory pages in a portion of memory within a computer system, said memory pages being of various page sizes from a base page size to a largest page size, said system comprising:
    a maintainer that maintains a set of freelists, each freelist associated with a particular page size and comprising zero or more entries therein, each entry representing a free physical memory page of the particular page size;
    a receiver that receives a memory allocation request for a memory page of a large page size from a process;

a determiner that determines if a current entry exists in the freelist associated with the large page size;

an allocator that allocates, to the process, the free physical memory page associated with the current entry, if the current entry exists;

a searcher that searches for a larger entry in the freelist associated with a next larger page size, if the current entry does not exist;

a splitter that splits the larger entry, if the larger entry is found by said searcher, said splitter comprising
- (a) a remover that removes the larger entry from the freelist searched by said searcher as a selected entry,
- (a) an inserter that inserts an appropriate amount of entries in a freelist corresponding to a next lower page size of the selected entry,
- (c) a determiner that determines whether the next lower page size is the large page size,
- (d) a remover that, if said determiner determines the next lower page size is not the large page size, chooses one of the appropriate amount of entries as the selected entry and removes the selected entry from the freelist corresponding to a next lower pape size, and
- (e) a first repeater that invokes said elements (b), (c), and (d) until a freelist associated with the large page size is referenced by said inserter; and a second repeater that invokes said searcher and said splitter until a freelist of the largest page size is searched or the larger entry is found by said searcher.

17. A computer program product comprising a computer useable medium having computer program logic stored therein, said computer program logic for dynamically allocating memory pages in a portion of memory within a computer system, said memory pages being of various page sizes from a base page size to a largest page size, wherein said computer program logic comprises:

a freelist creator that enables the computer to create an empty set of freelists for representing free memory pages, each freelist corresponding to a particular predetermined page size, and each freelist corresponding to a progressively larger page size beginning with the base page size and ending with the largest page size;

a searcher that enables the computer to search the portion of memory for free memory pages of the base page size;

an inserter that enables the computer to insert a freelist entry into the freelist corresponding to the base page size for each free memory page found by said searcher;

a specifier that enables the computer to specify a plurality of high water marks, wherein each of the high water marks defines a threshold amount for large pages of a given page size;

a coalescer that enables the computer to coalesce the portion of memory for a large memory page of a large page size when the number of memory papes of the large page size is less than the threshold amount for the large page size; and an updater that enables the computer to update said set of freelists by adding an entry to a freelist corresponding to the large memory page and deleting associated multiple entries from a freelist corresponding to the base page size, if a free large memory page is coalesced by said coalescer.

18. The computer program product of claim 17, further comprising:

a bitmap creator that enables the computer to create a bitmap comprising at least one bit for each base page size segment in the portion of memory; and a maintainer that enables the computer to dynamically maintain bits in the bitmap to represent base pages that are free and base pages that are busy.

19. A computer program product comprising a computer useable medium having computer program logic stored therein, said computer program logic for dynamically allocating memory pages in a portion of memory within a computer system, said memory pages being of various page sizes from a base page size to a largest page size, wherein said computer program logic comprises:

a maintainer that enables the computer to maintain a set of freelists, each freelist associated with a particular page size and comprising zero or more entries therein, each entry representing a free physical memory page of the particular page size;

a receiver that enables the computer to receive a memory allocation request for a memory page of a large page size from a process;

a determiner that enables the computer to determine if a current entry exists in the freelist associated with the large page size;

an allocator that enables the computer to allocate, to the process, the free physical memory page associated with the current entry, if the current entry exists;

a searcher that enables the computer to search for a larger entry in the freelist associated with a next larger page size, if the current entry does not exist; and a splitter that enables the computer to split the larger entry, if the larger entry is found by said searcher, said splitter comprising
- (a) a remover that removes the larger entry from the freelist searched by said searcher as a selected entry,
- (b) an inserter that inserts an appropriate amount of entries in a freelist corresponding to a next lower page size of the selected entry,
- (c) a determiner that determines whether the next lower page size is the large page size,
- (d) a remover that, if said determiner determines the next lower page size is not the large page size, chooses one of the anpropriate amount of entries as the selected entry and removes the selected entry from the freelist corresponding to a next lower page size, and
- (e) a first repeater that invokes said elements (b), (c), and (d) until a freelist associated with the large page size is referenced by said inserter; and a second repeater that enables the computer to invoke said searcher and said splitter until a freelist of the largest page size is searched or said larger entry is found by said searcher.

20. A system for dynamically allocating memory pages in a portion of memory within a computer system, said memory pages being of various page sizes from a base page size to a largest page size, said system comprising:

means for creating an empty set of freelists for representing free memory pages, each freelist corresponding to a particular predetermined page size, and each freelist corresponding to a progressively larger page size beginning with the base page size and ending with the largest page size;

means for searching the portion of memory for free memory pages of the base page size;

means for inserting a freelist entry into the freelist corresponding to the base page size for each free memory page found by said searching means;

means for specifying a plurality of high water marks, wherein each of the high water marks defines a threshold amount for large pages of a given page size;

means for coalescing the portion of memory for a large memory page of a large page size when the number of memory pages of the large page size is less than the threshold amount for the large page size; and means for updating the set of freelists by adding an entry to a freelist corresponding to the large memory page and deleting associated multiple entries from a freelist corresponding to the base page size, if a free large memory page is coalesced by said coalescing means.

21. A system for dynamically allocating memory pages in a portion of memory within a computer system, said memory pages being of various page sizes from a base page size to a largest page size, said system comprising:

means for maintaining a set of freelists, each freelist associated with a particular page size and comprising zero or more entries therein, each entry representing a free physical memory page of the particular page size;

means for receiving a memory allocation request for a memory page of a large page size from a process;

means for determining if a current entry exists in the freelist associated with the large page size;

means for allocating, to the process, the free physical memory page associated with the current entry, if the current entry exists;

means for searching for a larger entry in the freelist associated with a next larger page size, if the current entry does not exist;

means for splitting the larger entry, if the larger entry is found by said searching means, said splitting means comprising (a) means for removing the larger entry from the freelist searched by said searching means as a selected entry, (b) means for inserting an appropriate amount of entries in a freelist corresponding to a next lower page size of the selected entry, (c) means for determining whether the next lower page size is the large page size, (d) if said determining means determines the next lower page size is not the large page size, means for choosing one of the appropriate amount of entries as the selected entry and means for removing the selected entry from the freelist corresponding to a next lower page size, and (e) a first repeating means that invokes said elements (b), (c), and (d) until a freelist associated with the large page size is referenced by said inserting means; and a second repeating means that invokes said searching and said splitting until a freelist of the largest page size is searched or the larger entry is found by said searching means.

* * * * *